(12) United States Patent
Kraemer et al.

(10) Patent No.: US 10,924,858 B2
(45) Date of Patent: Feb. 16, 2021

(54) SHARED EARBUDS DETECTION

(71) Applicant: Google LLC, Mountain View, CA (US)

(72) Inventors: Martin Kraemer, Palo Alto, CA (US); Deborah Kathleen Vitus, San Mateo, CA (US); Dilip Prasanna Kumar, Mountain View, CA (US); Kristen Lawton, Mountain View, CA (US); Adam Champy, Palo Alto, CA (US); Christopher Branson, Mountain View, CA (US); Sandeep Singh Waraich, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/459,919

(22) Filed: Jul. 2, 2019

(65) Prior Publication Data

US 2020/0145757 A1    May 7, 2020

Related U.S. Application Data

(60) Provisional application No. 62/756,890, filed on Nov. 7, 2018.

(51) Int. Cl.
*H04R 5/04* (2006.01)
*G01P 3/44* (2006.01)
*H04R 1/10* (2006.01)

(52) U.S. Cl.
CPC .......... *H04R 5/04* (2013.01); *G01P 3/44* (2013.01); *H04R 1/1041* (2013.01); *H04R 2201/109* (2013.01); *H04R 2201/40* (2013.01); *H04R 2420/03* (2013.01)

(58) Field of Classification Search
CPC .. H04R 1/1041; H04R 5/04; H04R 2201/109; H04R 2201/40; H04R 2020/03; G01P 3/44
See application file for complete search history.

(56) References Cited

U.S. PATENT DOCUMENTS

| 2013/0279724 | A1  | 10/2013 | Stafford et al. |
| 2017/0049335 | A1* | 2/2017  | Duddy ................ H04R 1/1016 |
| 2018/0115815 | A1* | 4/2018  | Kumar ................ H04R 1/1041 |
| 2018/0279038 | A1* | 9/2018  | Boesen ............... H04R 1/1016 |

OTHER PUBLICATIONS

Christopher Branson and Adam Champy. "Same User Vs. Different User Detection." Aug. 9, 2018. Defensive Publication Series. Technical Disclosure Commons. 11 pages.

* cited by examiner

*Primary Examiner* — Regina N Holder
(74) *Attorney, Agent, or Firm* — Lerner, David, Littenberg, Krumholz & Mentlik, LLP

(57) ABSTRACT

The technology provides for a pair of earbuds. For instance, a first earbud and a second earbud may each include one or more sensors. The pair of earbuds may further include one or more processors configured to receive one or more first sensor signals from a first sensor in the first earbud and one or more second sensor signals from a second sensor in the second earbud. The one or more processors may compare the first sensor signals with the second sensor signals. Based on the comparison, the one or more processors may detect whether the first earbud and the second earbud are being worn by different users. Based on detecting that the first earbud and the second earbud are being worn by different users, the one or more processors may control the first earbud and the second earbud to use a shared mode.

20 Claims, 20 Drawing Sheets

SHARED EARBUDS DETECTION

CROSS-REFERENCE TO RELATED APPLICATIONS

This application claims the benefit of the filing date of U.S. Provisional Patent Application No. 62/756,890 filed Nov. 7, 2018, the disclosure of which is hereby incorporated herein by reference.

BACKGROUND

"Truly wireless" earbuds are earbuds that connect to each other wirelessly. A pair of such wireless earbuds may be used for a number of purposes, such as audio broadcasting, noise cancellation, voice calls, and translation. Sensors are typically included in these wireless earbuds for detecting different conditions, such as whether the wireless earbuds are loose or inserted into ears.

BRIEF SUMMARY

The present disclosure provides for receiving, by one or more processors, one or more first sensor signals from a first sensor in a first earbud and one or more second sensor signals from a second sensor in a second earbud; comparing, by the one or more processors, the first sensor signals with the second sensor signals; detecting, by the one or more processors based on the comparison, whether the first earbud and the second earbud are being worn by different users; and controlling, by the one or more processors based on detecting that the first earbud and the second earbud are being worn by different users, the first earbud and the second earbud to use a shared mode.

The first sensor signals may include at least one magnitude of total angular velocity experienced by the first earbud, and the second sensor signals may include at least one magnitude of total angular velocity experienced by the second earbud.

The method may further comprise generating, by the one or more processors, a difference profile between the first sensor signals and the second sensor signals, wherein the comparing is based on the difference profile. The difference profile may be generated by subtracting each value in the first sensor signals from a corresponding value in the second signals, the corresponding values having timestamps closest in time.

The method may further comprise determining, by the one or more processors, a common time base for the first sensor signals and the second sensor signals; and synchronizing, by the one or more processors, the first sensor signals and the second sensor signals to the common time base, wherein the comparing is between the synchronized first sensor signals and the synchronized second sensor signal.

The method may further comprise determining, by the one or more processors, a time-based correlation between the first sensor signals and the second sensor signals, wherein the comparing is based on the time-based correlation.

The method may further comprise: determining, by the one or more processors, one or more signal metrics for the first sensor signals and the second sensor signals; determining, by the one or more processors based on the signal metrics, whether the first sensor signals or the second sensor signals are within a predetermined quality threshold; and requesting, by the one or more processors based on determining that the first sensor signals or the second sensor signals are not within the predetermined quality threshold, new sensor signals.

The method may further comprise receiving, by the one or more processors, one or more secondary sensor signals from at least one secondary sensor of the first earbud or the second earbud, wherein detecting whether the first earbud and the second earbud are being worn by different user is further based on the secondary sensor signals. The secondary sensor signals may include a power for transmitting data through a communication link from the first earbud to the second earbud, and a power for receiving data through the communication link by the first earbud from the second earbud. The secondary sensor signals may include touch sensor signals indicating that a positioning of the first earbud or the second earbud inside an ear is being adjusted. The secondary sensor signals may include acceleration signals indicating a touch gesture at the first earbud or the second earbud.

The method may further comprise generating, by the one or more processors, a prompt requesting user confirmation that the first earbud and the second earbud are being worn by different users; and receiving, by the one or more processors, user input confirming that the first earbud and the second earbud are being worn by different users, wherein controlling to use the shared mode is further based on receiving the user input.

The method may further comprise generating, by the one or more processors, a confidence score for detecting that the first earbud and the second earbud are being worn by different users; and comparing, by the one or more processors, the confidence score to a confidence threshold for detecting that the first earbud and the second earbud are being worn by different users, wherein controlling to use the shared mode is based on the confidence score meeting the confidence threshold. The method may further comprise generating, by the one or more processors, a confidence score for detecting that the first earbud and the second earbud are being worn by different users; and comparing, by the one or more processors, the confidence score to a confidence threshold for detecting that the first earbud and the second earbud are being worn by different users, wherein computing the time-based correlation is based on the confidence score not meeting the confidence threshold. The method may further comprise generating, by the one or more processors, a confidence score for detecting that the first earbud and the second earbud are being worn by different users; and comparing, by the one or more processors, the confidence score to a confidence threshold for detecting that the first earbud and the second earbud are being worn by different users, wherein receiving the secondary sensor signals are based on the confidence score not meeting the confidence threshold.

The method may further comprise receiving, by the one or more processors, on-head detection sensor signals indicating whether the first earbud and the second earbud are both being worn, wherein receiving the first sensor signals and the second signals are based on the on-head detection sensor signals indicating that the first earbud and the second earbud are both being worn; not receiving, by the one or more processors, the first sensor signals and the second sensor signals when the on-head detection sensor signals indicate that at least one of the first earbud and the second earbud is not being worn. The method may further comprise controlling, by the one or more processors, to stop receiving sensor signals after a predetermined period of time following the on-head detection indicating that both the first earbud and the second earbud are being worn.

The method may further comprise controlling, by the one or more processors, based on detecting that the first earbud and the second earbud are not being worn by different users, the first earbud and the second earbud to use a normal mode.

The disclosure further provides for a system, comprising a first earbud including one or more sensors, a second earbud including one or more sensors, and one or more processors configured to: receive one or more first sensor signals from a first sensor in the first earbud and one or more second sensor signals from a second sensor in the second earbud; compare the first sensor signals with the second sensor signals; detect, based on the comparison, whether the first earbud and the second earbud are being worn by different users; and control, based on detecting that the first earbud and the second earbud are being worn by different users, the first earbud and the second earbud to use a shared mode.

The one or more sensors of the first earbud and the one or more sensors of the second earbud may each include at least one of: a gyroscope, an accelerometer, an electrical sensor, a magnetic sensor, an optical sensor, a positioning sensor.

DETAILED DESCRIPTION

Overview

Figure 1A:
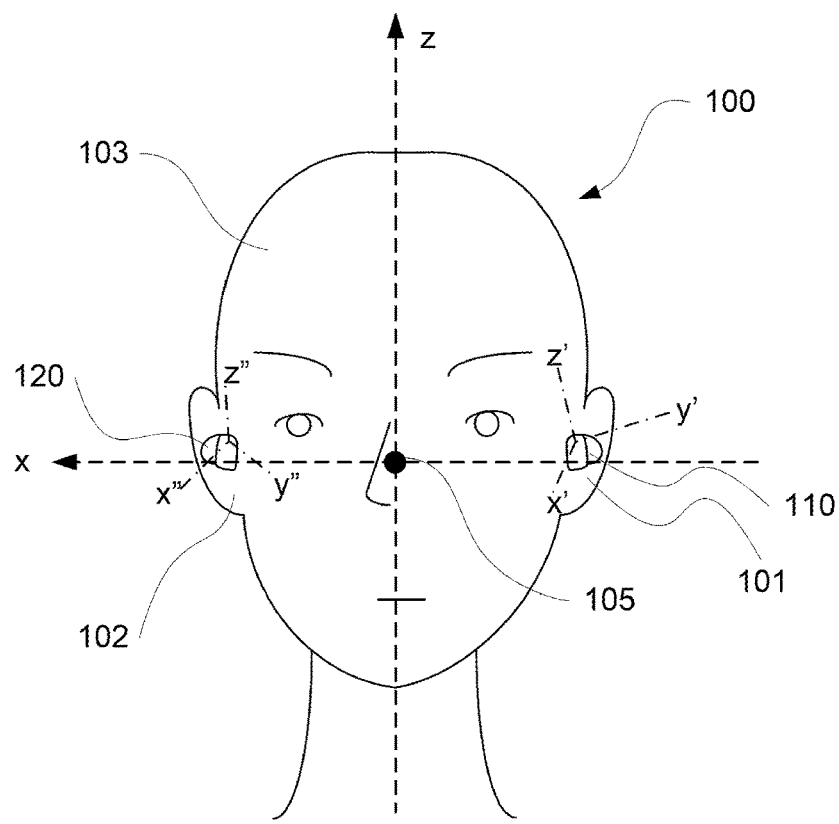
FIGS. 1A and 1B are pictorial diagrams illustrating an example pair of earbuds worn by a same user in accordance with aspects of the disclosure.

The technology relates to detecting whether a pair of wireless earbuds are being worn by a same user ("normal state") or by different users ("shared state"). For instance, a user may want a pair of wireless earbuds to function in different modes depending on whether the user is wearing both of the wireless earbuds, or if the user is sharing the wireless earbuds with another user. For example, while using the wireless earbuds for translation, the user may want the two wireless earbuds to have the same language setting when wearing both of the wireless earbuds, but may want the two wireless earbuds to have different language settings when sharing with another user who speaks a different language. As another example, while using the wireless earbuds to play audio, the user may want the two wireless earbuds to have different audio settings (e.g., stereophonic) when wearing both of the wireless earbuds, but may want the two wireless earbuds to have the same audio setting (e.g., monophonic) when sharing with another user. As still another example, while routing audio data between two earbuds may be more efficient and reliable when both are being worn by the same user, routing audio data directly from a paired device to each earbud may be more efficient and reliable when the two earbuds are worn by different users. In order facilitate these functions, a pair of wireless earbuds are configured to automatically detect whether the pair of wireless earbuds are being worn by a same user or different users.

For instance, the pair of wireless earbuds may include a first earbud and a second earbud, each including one or more sensors. For example, each of the earbuds may include an Inertial Measurement Unit ("IMU"), which may include one or more gyroscopes for measuring angular motions, and/or one or more accelerometers for measuring linear motions. As other examples, each of the wireless earbuds may additionally or alternatively include optical sensors (such as cameras), electrical sensors (such as capacitive sensors), magnetic sensors (such as Hall Effect sensors), positioning sensors (such as compasses), vibration sensors (such as microphones), etc.

The pair of wireless earbuds may include one or more processors for receiving sensor signals from the one or more sensors. For instance, the one or more processors may receive one or more first sensor signals from a first sensor in the first earbud, and receive one or more second sensor signals from a second sensor in the second earbud. For example, the first sensor signals may be a batch of angular velocities measured by a gyroscope in the first earbud during a time period, and the second sensor signals may be a batch of angular velocities measured by a gyroscope in the second earbud during the same time period. In this example, since objects attached to a same rigid body experience a same magnitude of total angular motion, detecting of shared state may be based on measurements of angular motions, such as the batches of angular velocities.

The one or more processors may compare the first sensor signals with the second sensor signals. For instance, the one or more processors may generate a difference profile between the first sensor signals and the second sensor signals. As another example, the one or more processors may perform time-based correlations between the first sensor signals and the second sensor signals. In this regard, the first sensor signals and the second sensor signals may first be synchronized to a common time base. In some examples, other processing methods, such as filtering, determining signal quality, etc., may be performed on the sensor signals before comparisons are made.

Based on the comparison, the one or more processors may detect whether the first earbud and the second earbud are in a shared state. For instance, the difference profile may be compared to one or more thresholds. For example, differences meeting a threshold may indicate that the pair of earbuds are in the shared state. As another example, signal metrics, such as standard deviations and attenuation ratios, may be determined for the first sensor signals, the second sensor signals, and/or the difference profile, and compared to one or more thresholds for detecting whether the earbuds are in the shared state.

Based on a detection that the earbuds are in the shared state, the processors may control the pair of earbuds to use a shared mode. In this regard, the shared mode may include any of a number of settings, such as settings for audio broadcasting, noise cancellation for conference calls, language settings for translation, etc. Otherwise, the one or more processors may control the pair of earbuds to use a normal mode.

In some instances, the one or more processors may receive secondary sensor signals, and further use the secondary sensor signals for detecting the shared state. For example, the secondary sensor signals may include information on a communication link between the two earbuds. Detecting shared state may be further based on a strength of the communication link. As another example, the secondary sensor signals may include touch sensor signals indicating that a positioning of the first and/or the second earbud is being adjusted in an ear. As such, detecting shared state may not be performed while the positioning of the first and/or the second earbud is being adjusted.

In some instances, before detecting shared state, the one or more processors may first receive on-head detection sensor signals indicating whether both the first and second earbuds are being worn, regardless of whether they are worn by the same or different users. For example, if at least one earbud is not being worn, the one or more processors may not need to receive and/or analyze sensor signals for detecting the shared state, since one earbud cannot be shared. As another example, the one or more processors may only receive and/or analyze sensor signals for detecting the shared state for a predetermined period after receiving on-head detection signals indicating that both earbuds are being worn.

In some instances, the one or more processors may further generate a confidence score for the detection of the shared state, and use the confidence score to streamline the process. For example, if the confidence score for detecting shared state based on the difference profile does not meet a predetermined confidence threshold, the one or more processors may then use time-based correlations. In another example, if the confidence score for detecting the shared state based on comparison of one type of sensor signals does not meet the predetermined confidence threshold, the one or more processors may then use other types of sensor signals, such as the secondary sensor signals described above. In still another example, if the confidence score for detecting shared state based on sensor signals does not meet the predetermined confidence threshold, the one or more processors may then generate a prompt request user conformation of shared state.

The technology is advantageous because it provides for accurate and efficient detections of whether a pair of wireless earbuds are being worn by a same user, or shared by different users, which may enable a number of enriched user experiences. As described herein, accurate detections can be achieved using relatively simple computations with a relatively small amount of sensor signals collected during a short amount of time, which ensure that the earbuds are left with most of the computational and energy resources for other functions, such as processing and outputting audio. Further improvements in accuracy of the detections are provided by using additional and/or alternative types of sensor signals. The technology also provides the use of confidence scores, thresholds, and other smart decision logics as gatekeepers to ensure computational and energy efficiency. In some instances, by assuming the more likely state of being worn by the same user unless a high level of confidence is achieved or user confirmation is received, user experience may be further improved by the stability.

Example Systems

Figure 1B:
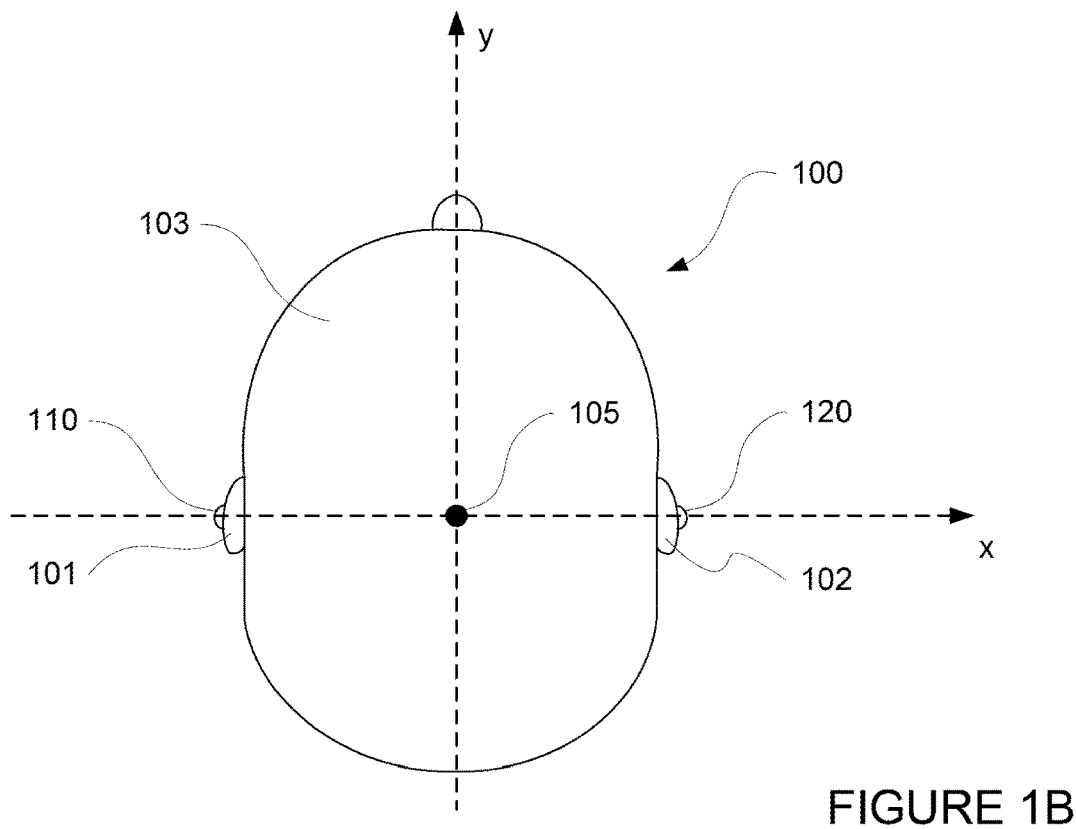

FIGS. 1A and 1B illustrate a user 100 wearing a pair of wireless earbuds including a first earbud 110 and a second earbud 120. FIG. 1A shows a front view of the user 100 and FIG. 1B shows a top view of the user 100. For example as shown, the first earbud 110 may be configured to be worn in a left ear 101 of the user 100, and the second earbud 120 may be configured to be worn in a right ear 102 of the user 100. The wireless earbuds 110, 120 may be wireless in that they do not require a wired connection for use. For instance, the wireless earbuds may receive signals wirelessly such as from a music player, phone, or other device to perform a number of functions, such as to generate output, to communicate with each other and/or other devices, to be charged, etc. The wireless earbuds 110, 120 may be truly wireless, in that they also do not require a wired connection in order to communicate with each other. The wireless earbuds 110, 120 may be configured to have physical features, such as ear tips, that allow the wireless earbuds 110, 120 to securely and comfortably fit in the ears 101, 102 respectively.

As further shown in FIGS. 1A and 1B, while being worn by the same user 100, the first earbud 110 and the second earbud 120 are configured to have fixed positions with respect to the user's ears 101 and 102, as well as with respect to each other. As such, the first earbud 110 and the second earbud 120 may be considered as attached to a same rigid body—the head 103 of the user 100—and move along with the same rigid body. Motions of the user's head 103 may be defined with respect to an inertial frame of the user's head 103. For example, the inertial frame may be defined by various axes through the user's head 103, such as a vertical axis ("z-axis"), a first horizontal axis ("x-axis"), and a second horizontal axis ("y-axis"). The x-, y-, and/or z-axes may intersect at a point 105.

As shown in FIG. 1A, the first earbud 110 and the second earbud 120 may each also have an inertial frame (indicated by dash-dot lines). For example, the inertial frame for each of the first earbud 110 and the second earbud 120 may be defined by an Inertial Measurement Unit (IMU) therein. For example, the inertial frame may be defined by axes of a 3-axes accelerometer and/or axes of a 3-axes gyroscope. In some instances, the accelerometer and the gyroscope in an IMU may have the same set of axes such that both measure motion with respect to the same set of axes. For example as shown, the inertial frame of the first earbud 110 may be defined by x'-, y'-, and z'-axes, and the inertial frame of the second earbud 120 may be defined by x"-, y"-, and z"-axes. Further as shown, depending on how the first earbud 110 and the second earbud 120 are being worn, and other factors such as ear anatomy, the inertial frame of the first earbud 110 and the inertial frame of the second earbud 120 may not align with each other, or with the inertial frame of the user's head 103.

Figure 2:
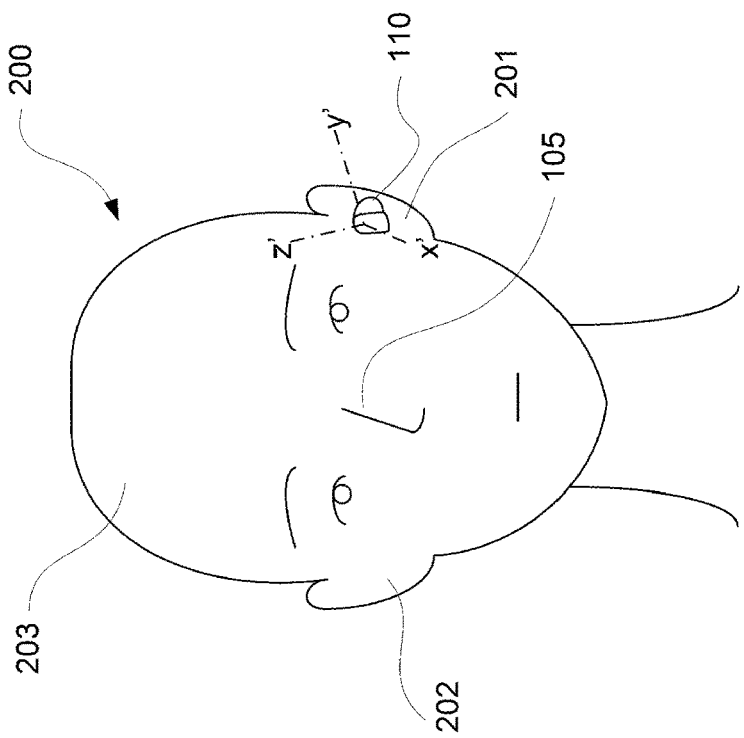
FIG. 2 is a pictorial diagram illustrating the example pair of earbuds worn by two different users in accordance with aspects of the disclosure.
Figure 2:
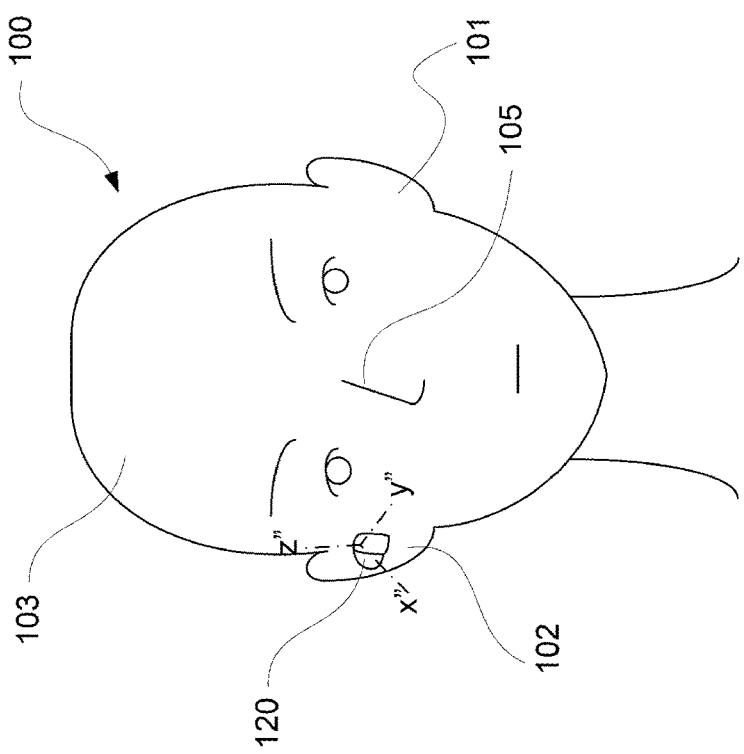

FIG. 2 illustrates two different users 100 and 200 sharing the pair of wireless earbuds 110, 120. For instance as shown, the first earbud 110 may be worn in the left ear 201 of the user 200, while the second earbud 120 may be worn in the right ear 102 of the user 100. As further shown in FIG. 2, while being worn by two different users 100, 200, the first earbud 110 may be configured to have a fixed position with respect to the left ear 201 of user 200, the second earbud 120 may be configured to have a fixed position with respect to the right ear 102 of user 100. In this regard, the first earbud 110 and the second earbud 120 may be considered as attached to two different rigid bodies—the head 103 of the user 100 and the head 203 of the user 200, respectively, and move along with two different rigid bodies. Although not shown, the inertial frame of the second user's head 203 may also be defined in terms of axes. Similarly, the inertial frame of the first earbud 110 may not align with the inertial frame of the head 203 of the user 200.

Figure 3:
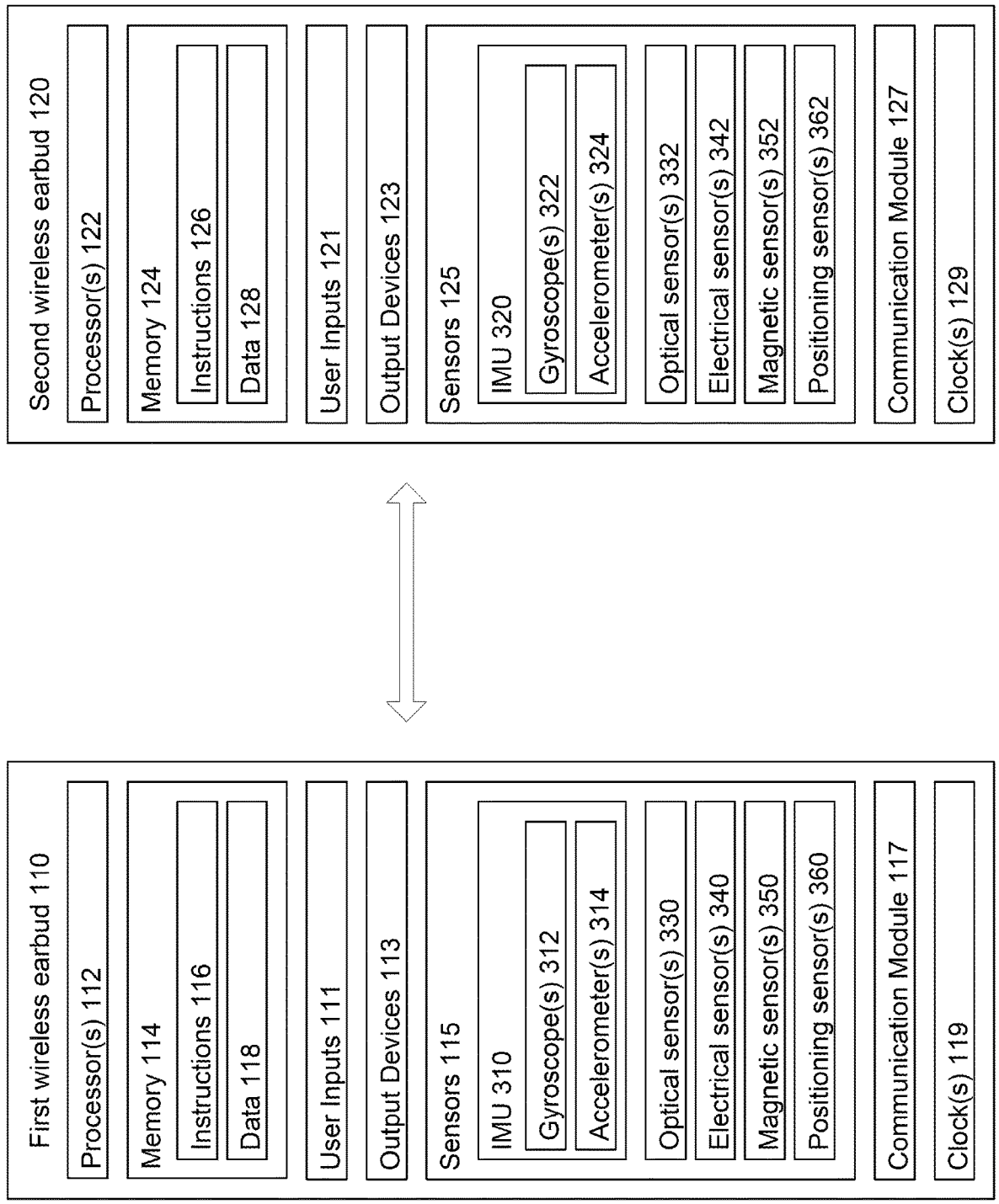
FIG. 3 is a block diagram of the example pair of earbuds of FIGS. 1A-B in accordance with aspects of the disclosure.

FIG. 3 is a functional block diagram of the pair of wireless earbuds 110, 120 in which the features described herein may be implemented. It should not be considered as limiting the scope of the disclosure or usefulness of the features described herein. For example as shown, the first earbud 110 may contain one or more processors 112, memory 114 and other components typically present in general purpose computing devices, and the second earbud 120 may similarly contain one or more processors 122, memory 124 and other components typically present in general purpose computing devices. For example, the processors 112 and memory 114 may be part of a microcontroller unit ("MCU").

Memories 114, 124 can store information accessible by the one or more processors 112, 122, including instructions 116, 126, that can be executed by the one or more processors 112, 122. Memories 114, 124 can also include data 118, 128 that can be retrieved, manipulated or stored by the processors 112, 122. The memories can be of any non-transitory type capable of storing information accessible by the processor, such as a hard-drive, memory card, ROM, RAM, DVD, CD-ROM, write-capable, and read-only memories.

The instructions 116, 126 can be any set of instructions to be executed directly, such as machine code, or indirectly, such as scripts, by the one or more processors. In that regard, the terms "instructions," "application," "steps" and "programs" can be used interchangeably herein. The instructions can be stored in object code format for direct processing by a processor, or in any other computing device language including scripts or collections of independent source code modules that are interpreted on demand or compiled in advance. Functions, methods and routines of the instructions are explained in more detail below.

Data 118, 128 can be retrieved, stored or modified by the one or more processors 112, 122 in accordance with the instructions 116, 126. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112, 122 can be any conventional processors, such as a commercially available CPU. Alternatively, the processors can be dedicated components such as an application specific integrated circuit ("ASIC") or other hardware-based processor. Although not necessary, the wireless earbuds 110, 120 may include specialized hardware components to perform specific computing processes, such as decoding video, matching video frames with images, distorting videos, encoding distorted videos, etc. faster or more efficiently.

Although FIG. 3 functionally illustrates the processor, memory, and other elements of wireless earbuds 110, 120 as being within the same block, the processor, computer, computing device, or memory can actually comprise multiple processors, computers, computing devices, or memories that may or may not be stored within the same physical housing. For example, the memory can be a hard drive or other storage media located in housings different from that of the wireless earbuds 110, 120. Accordingly, references to a processor, computer, computing device, or memory will be understood to include references to a collection of processors, computers, computing devices, or memories that may or may not operate in parallel.

Further as shown in FIG. 3, wireless earbuds 110, 120 may include one or more user inputs, such as user inputs 111, 121 respectively. For instance, user inputs may include mechanical actuators, soft actuators, periphery devices, sensors, and/or other components. Examples of sensors in inputs 111, 121 may include vibration sensors, such as microphones, touch sensors, such as capacitive or optical sensors, etc. For example, users may be able to control various audio characteristics using the user inputs 111, 121, such as turning audio on and off, adjusting volume, etc.

Wireless earbuds 110, 120 may include one or more outputs devices, such as output devices 113, 123 respectively. For instance, output devices may include one or more speakers, transducers or other audio outputs, a user display, a haptic interface or other tactile feedback that provides non-visual and non-audible information to the user. For example, speakers in output devices 113, 123 may be used to play music, emit audio for navigational or other guidance, for multimedia files, for voice calls, for translated speech, etc. As another example, output device 113 may include one or more devices configured to generate electrical or magnetic signals that can be detected by sensors in wireless earbud 120, and similarly, output device 123 may include one or more devices configured to generate electrical or magnetic signals that can be detected by sensors in wireless earbud 110.

Wireless earbuds 110, 120 may include one or more sensors, such as sensors 115, 125 respectively. For instance, sensors 115, 125 may include motion sensors, such as one or more Inertial Measurement Unit(s) ("IMU") 310, 320. According to some examples, the IMUs 310, 320 may each include one or more gyroscope(s) 312, 322, such as a 3-axis gyroscope. For example, gyroscope 312 may be configured to measure angular motion, such as angular velocity and rotational angle, about x'-, y'-, and z'-axes, and gyroscope 322 may measure angular motion, such as angular velocity and rotational angle, about x"-, y"-, and z"-axes. The IMUs 310, 320 may further include one or more accelerometer(s) 314, 324, such as a 3-axis accelerometer. For example, accelerometer 314 may be configured to measure linear motion, such as linear acceleration, along x'-, y'-, and z'-axes, and accelerometer 324 may be configured to measure linear motion, such as linear acceleration, along x"-, y"-, and z"-axes.

As other examples, the sensors 115, 125 may include one or more optical sensor(s) 330, 332, such as a camera, an IR sensor, a photoplethysmography (PPG) sensor, etc. The sensors 115, 125 may also include one or more electrical sensor(s) 340, 342, such as a capacitive sensor, an inductive sensor, etc. The sensors 115, 125 may further include one or more magnetic sensors, 350, 352, such as a Hall Effect sensor, a near-field induction communication (NFMI) sensor, etc. Still further, the sensors 115, 125 may include positioning sensor(s) 360, 362, such as a compass, a GPS chipset, etc. Additionally, the sensors 115, 125 may include sensors used in the user inputs 111, 121, such as a microphone, a touch sensor, etc. Other examples of sensors may further include a barometer, a vibration sensor, a heat sensor, a radio frequency (RF) sensor, a magnetometer, and a barometric pressure sensor. Additional or different sensors may also be employed.

In order to obtain information from and send information to each other, as well as to other remote devices, wireless earbuds 110, 120 may each include a communication module, such as communication modules 117, 127 respectively. The communication modules may enable wireless network connections, wireless ad hoc connections, and/or wired connections. Via the communication modules 117, 127, the wireless earbuds 110, 120 may establish communication links, such as wireless links. The communication modules 117, 127 may be configured to support communication via cellular, LTE, 4G, WiFi, GPS, and other networked architectures. The communication modules 117, 127 may be configured to support Bluetooth®, Bluetooth LE, near field communications, and non-networked wireless arrangements. The communication modules 117, 127 may support wired connections such as a USB, micro USB, USB type C or other connector, for example to receive data and/or power from a laptop, tablet, smartphone or other device.

The communication modules 117, 127 may be configured to measure signal strengths for wireless connections. For instance, wireless connections may be established between the wireless earbuds 110, 120 and other remote devices. For example, communication modules 117, 127 may be configured to measure power of a link when data is transmitted and power of the link when data is received. As another example, communication modules 117, 127 may be configured to measure received signal strength indicator (RSSI) of a Bluetooth® connection. In some instances, communication modules 117, 127 may be configured to transmit the measured power or signal strengths to another device, including to each other and/or another remote device.

The wireless earbuds 110, 120 may each include one or more internal clocks 119, 129. The internal clocks may provide timing information, which can be used for time measurement for apps and other programs run by the computing devices, and basic operations by the computing devices, sensors, inputs/outputs, GPS, communication system, etc. In some instances, the wireless earbuds 110, 120 may each include a plurality of clocks. For example, clocks 119 may include one or more clocks in a Bluetooth module or chipset, an IMU clock, and an MCU clock; and clocks 129 may also include one or more clocks in a Bluetooth module or chipset, an IMU clock, and an MCU clock. In some instances, a first Bluetooth clock in a Bluetooth module of wireless earbud 110 may be configured as a "master clock," and a second Bluetooth clock in a Bluetooth module of wireless earbud 120 may be configured as an "estimated clock" that is synchronized to the master clock.

Figure 4:
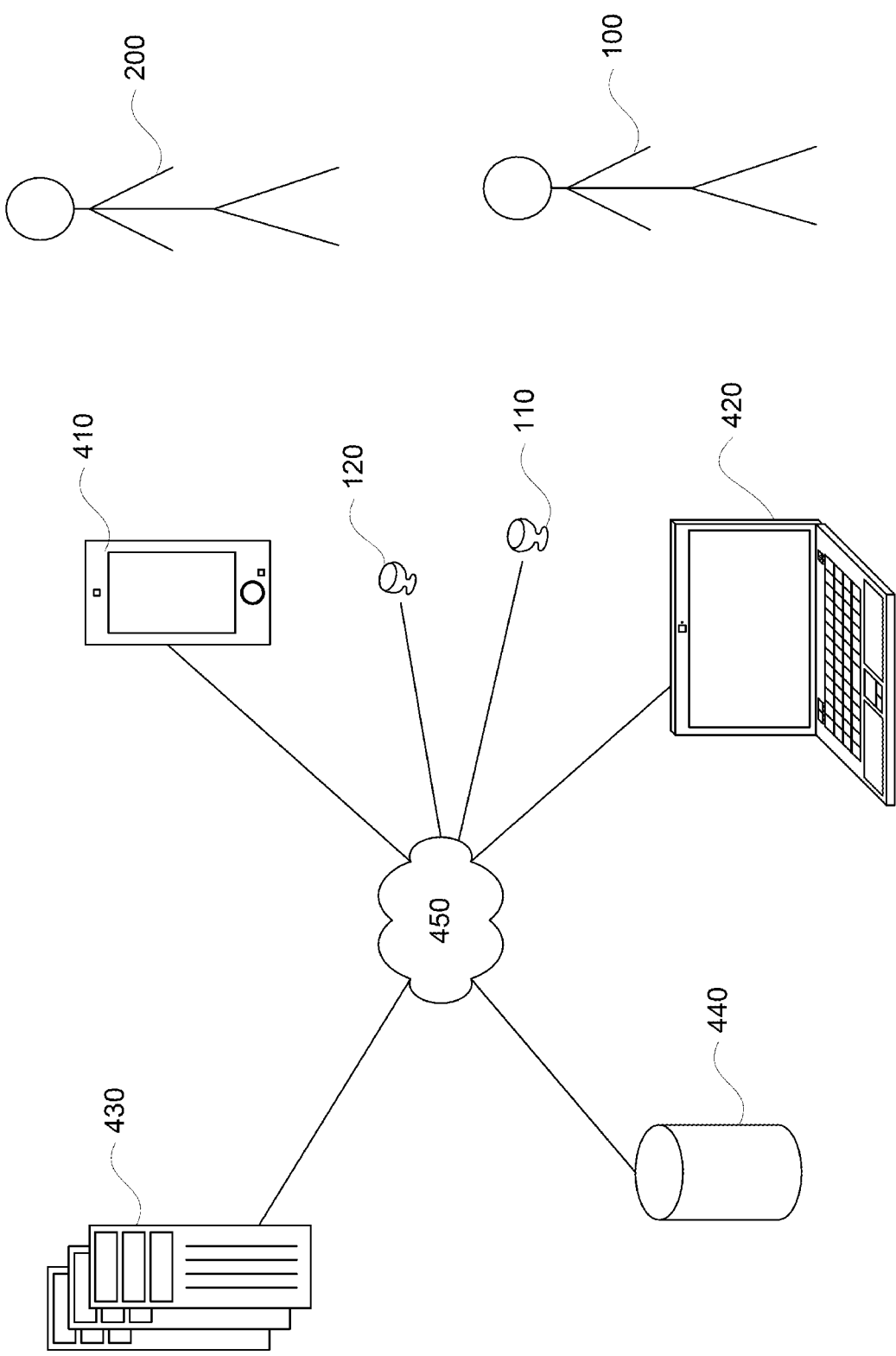
FIG. 4 is a block diagram of an example system including the example pair of earbuds in accordance with aspects of the disclosure.

Using the communication modules 117, 127, wireless earbuds 110, 120 may communicate with other devices in a system via a network. For instance, FIG. 4 is a pictorial diagram illustrating an example system 400 in which the features described herein may be implemented. The system 400 may include the wireless earbuds 110, 120, computing devices 410, 420, 430, and a storage system 440. As shown, the wireless earbuds 110, 120, computing devices 410, 420, 430, and storage system 440 can each be at different nodes of a network 450 and capable of directly and indirectly communicating with other nodes of network 450. Although only a few computing devices are depicted in FIG. 4, it should be appreciated that a typical system can include a large number of connected computing devices, with each different computing device being at a different node of the network 450.

The network 450 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

Each of the computing devices 410, 420, 430 may be configured similarly to the wireless earbuds 110, 120, with one or more processors, memory and instructions as described above. For instance, computing devices 410 and 420 may each be a client device intended for use by a user, such as user 100 or 200, and have all of the components normally used in connection with a personal computing device such as a central processing unit (CPU), memory (e.g., RAM and internal hard drives) storing data and instructions, user inputs and/or outputs, sensors, communication module, positioning system, clock, etc. For example, communication modules of computing devices 410, 420 may similarly include one or more antennas for transmitting and/or receiving signals, such as Bluetooth® signals, and may also be configured to measure signal strengths of communication links. As another example, computing devices 410, 420 may have the same and/or different types of user inputs and/or outputs as wireless earbuds 110, 120, such as a screen or touchscreen for displaying texts, images, videos, etc. As yet another example, computing device 430 may be a server computer and may have all of the components normally used in connection with a server computer, such as processors, and memory storing data and instructions.

The computing devices 410, 420, and 430 may each comprise a full-sized personal computing device, or may alternatively comprise mobile computing devices capable of wirelessly exchanging data with a server over a network such as the Internet. For example, computing device 410 may be a mobile device, such as a mobile phone as shown in FIG. 4, or some other mobile device such as a wireless-enabled PDA. As another example, computing device 420 may be a laptop computer as shown in FIG. 4, or some other computing device such as a desktop computer, a tablet, or other smart device that is capable of obtaining information via communication links. In other examples (not shown), system 400 may additionally or alternatively include wearable devices, such as a smartwatch, a head mount device, etc.

As with memories 114, 124, storage system 440 can be of any type of computerized storage capable of storing information accessible by one or more of the wireless earbuds 110, 120, and computing devices 410, 420, 430, such as a hard-drive, memory card, ROM, RAM, DVD, CD-ROM, write-capable, and read-only memories. In addition, storage system 440 may include a distributed storage system where data is stored on a plurality of different storage devices which may be physically located at the same or different geographic locations. Storage system 440 may be connected to the computing devices via the network 450 as shown in FIG. 4 and/or may be directly connected to any of wireless earbuds 110, 120, and computing devices 410, 420, 430.

Example Methods

Further to example systems described above, example methods are now described. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

Figure 5A:
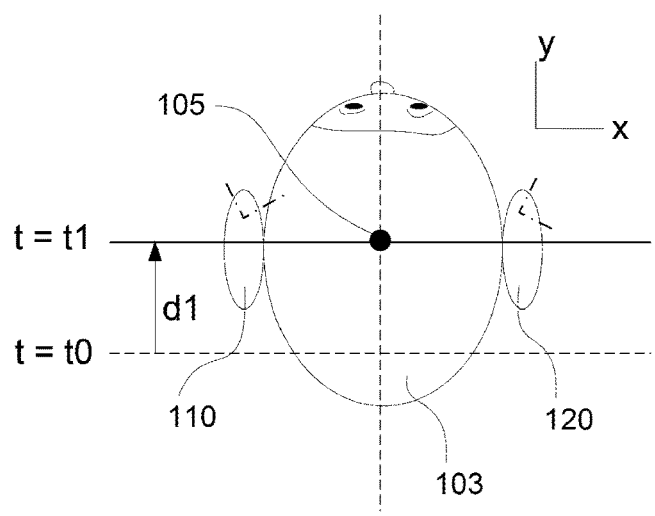
FIGS. 5A, 5B, and 5C are pictorial diagrams illustrating example linear movements in accordance with aspects of the disclosure.
Figure 5B:
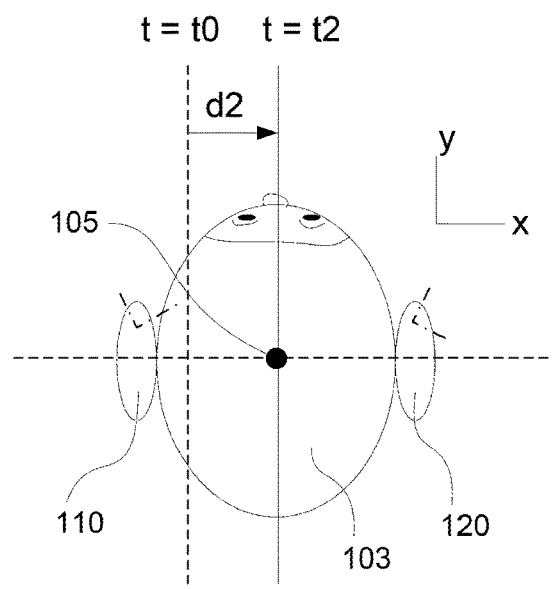
Figure 5C:
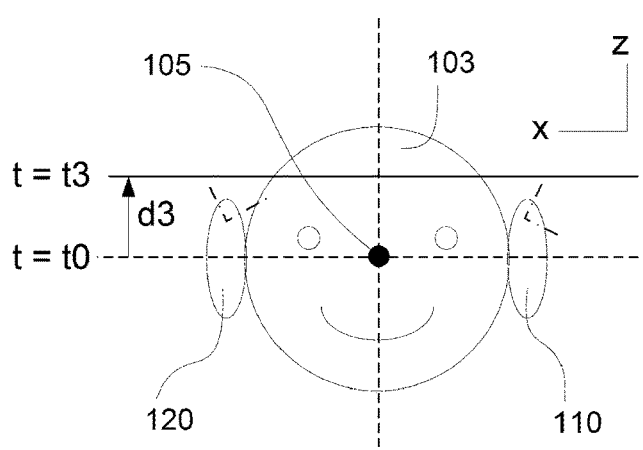

For instance, a user wearing a pair of wireless earbuds may move in any of a number of ways. FIGS. 5A, 5B, and 5C illustrate example linear or translational movement of the user 100 wearing the pair of earbuds 110, 120. FIG. 5A shows user 100 moving a distance d1 along the y-axis between time point t0 and time point t1. FIG. 5B shows user 100 moving a distance d2 along the x-axis between time point t0 and time point t2. FIG. 5C shows user 100 moving a distance d3 along the z-axis between time point t0 and time point t3. Although, for simplicity, FIGS. 5A-5C each shows a linear motion along a single axis, in other instances a motion of the user 100 may include linear motions along multiple axes.

As shown, when both being worn on the same user's head 103, the first earbud 110 and the second earbud 120 both experience the same linear movement as the user's head 103. However, as described above with respect to FIG. 1A, because the inertial frame of the first earbud 110 may not align with the inertial frame of the second earbud 120, the IMU 310 of the first earbud 110 may measure a linear motion with individual components (e.g., acceleration along x'-, y'-, z'-axes) that are different from the individual components (e.g., acceleration along x"-, y"-, z"-axes) measured by the IMU 320 of the second earbud 120. Nonetheless, because the first earbud 110 and the second earbud 120 are attached to the same rigid body, magnitude of the total linear motion measured by both IMUs 310, 320 at or around the same time should be approximately the same. For example, accelerators 314, 324 may measure approximately the same magnitude of total acceleration for each of the examples shown in FIGS. 5A-5C.

Figure 6A:
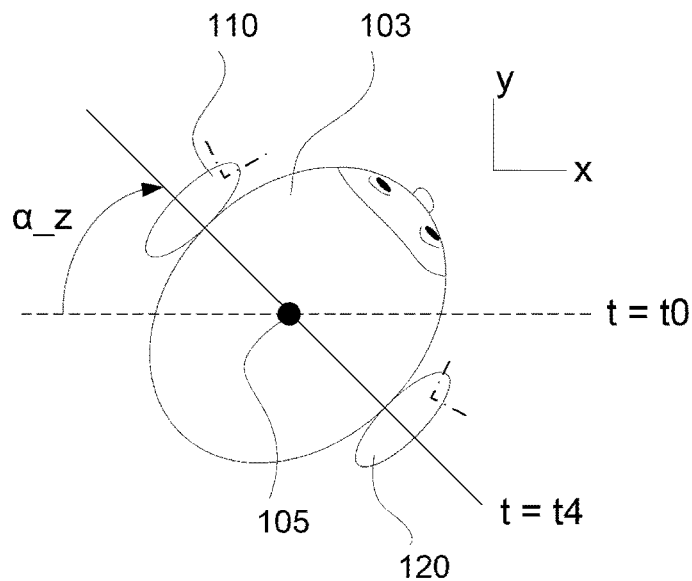
FIGS. 6A, 6B, and 6C are pictorial diagrams illustrating example rotational movements in accordance with aspects of the disclosure.
Figure 6B:
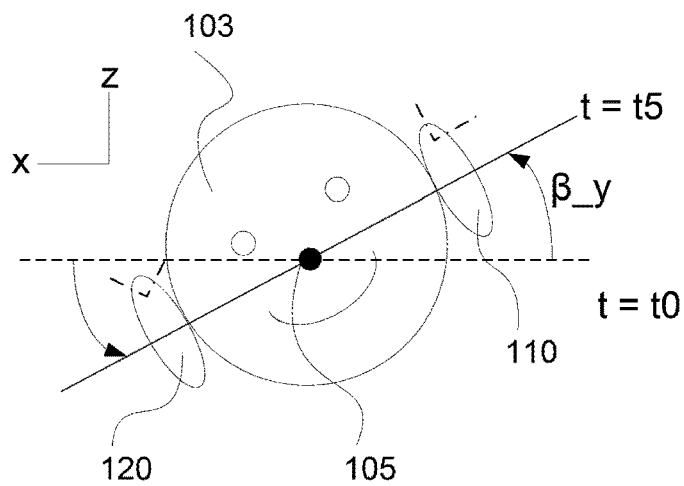
Figure 6C:
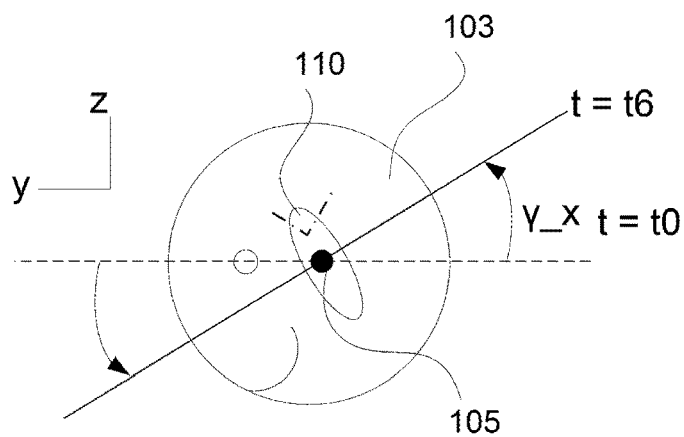

FIGS. 6A, 6B, and 6C illustrate example rotational movements of the head 103 of the user 100 wearing the pair of earbuds 110, 120. FIG. 6A shows user 100 rotating the head 103 about the z-axis by an angle of $\alpha\_z$ between time point t0 and time point t4. FIG. 6B shows user 100 rotating the head 103 about the y-axis by an angle of $\beta\_y$ between time point t0 and time point t5. FIG. 6C shows user 100 rotating the head 103 about the x-axis by an angle of $\gamma\_x$ between time point t0 and time point t6. Although, for simplicity, FIGS. 6A-6C each shows a rotation about a single axis, in other instances a motion of the user 100 may include rotations about multiple axes.

As shown, when both being worn on the same user's head 103, the first earbud 110 and the second earbud 120 both experience the same angular motions. However, due to different alignment of inertial frames, the IMU 310 of the first earbud 110 may measure angular motion with individual components (e.g., angles about x'-, y'-, z'-axes) different from the individual components (e.g., angles about x"-, y"-, z"-axes) measured by the IMU 320 of the second earbud 120. Nonetheless, because the first earbud 110 and the second earbud 120 are attached to the same rigid body, magnitude of the total angular motion measured by both IMUs 310, 320 at or around the same time should be approximately the same. For example, gyroscopes 312, 322 may measure approximately the same magnitude of total angular velocity for each of the examples shown in FIGS. 6A-6C.

Further, rotational movements of the head 103 shown in the examples of FIGS. 6A-6C may not only include angular components that can be measured by gyroscopes 312, 322 of the IMUs 310, 320, but also include linear components that can be measured by the accelerometers 314, 324. However, in instances where the first earbud 110 and the second earbud 120 are not equidistant from a center of rotation of the user's head 103, the accelerators 314, 324 may measure different linear motions, despite being attached to the same rigid body.

Figure 7:
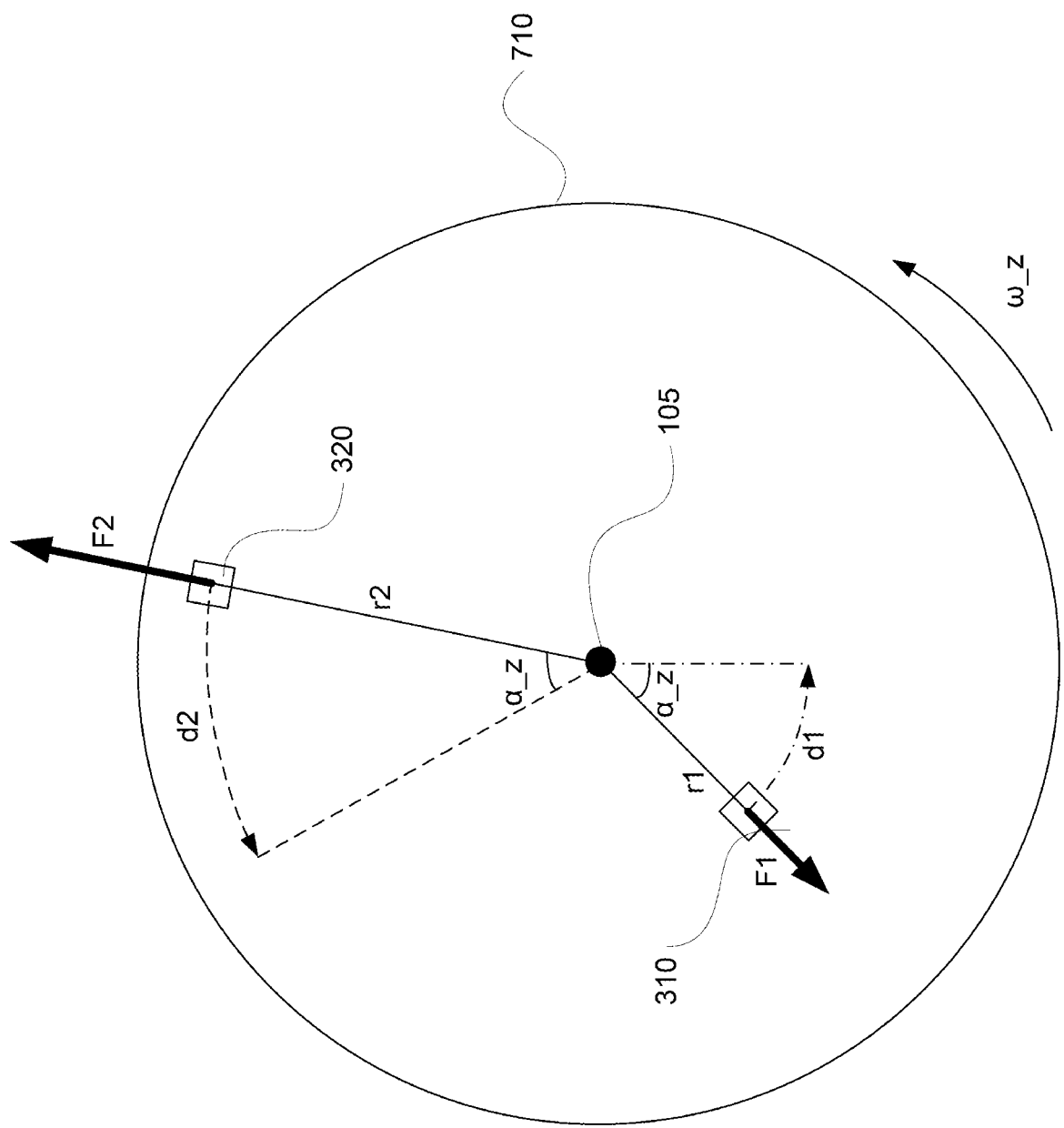
FIG. 7 is a pictorial diagram illustrating example linear and angular motion measurements for the example pair of earbuds being worn by the same user in accordance with aspects of the disclosure.

FIG. 7 is an example pictorial diagram illustrating example linear and angular motions measured by IMUs 310, 320 during a rotational movement when the IMUs 310, 320 are not positioned at equal distance from a center of rotation. As shown, a rate table 710 may be a circular table that rotates about a center such that objects attached to the rate table 710 may experience the same rotational motion. For example, the rate table 710 may present a rough illustration of a rotational movement of the user's head 103, where the center of the rate table 710 may be the point 105 where x-, y-, and z-axes intersect. Further as shown, due to factors such as ear anatomy and orientation while being worn, IMU 310 of the first earbud 110 may be located on the rate table 710 at a first radius r1 from the point 105, while IMU 320 of the second earbud 120 may be located on the rate table 710 at a second radius r2 from the point 105.

The rate table 710 is shown being rotated about the center 105 at an angular velocity of $\omega\_z$ about the z-axis. Being attached to the rate table 710, IMU 310 of the first earbud 110 and IMU 320 of the second earbud 120 are also being rotated at an angular velocity of $\omega\_z$. As such, during a same time period, both IMU 310 and IMU 320 may be rotated by an angle of $\alpha\_z$. Despite having different inertial frames, the same magnitude of total rotational angle of $\alpha\_z$ are measured by both the gyroscope 312 in the first earbud 110 and the gyroscope 322 in the second earbud 120. Likewise, gyroscope 312 of the first earbud 110 may measure the same magnitude of total angular velocity ω_z as the gyroscope 322 of the second earbud 110.

In contrast to total angular velocity, the two IMUs 310, 320 may measure different total linear accelerations when the two IMUs are not equidistant from the center of rotation. An object traveling in circular motion experiences a centripetal force towards the center of rotation, and a reactive centrifugal force that is equal in magnitude, but opposite in direction to the centripetal force. Such centripetal and centrifugal forces have magnitudes proportional to a distance of the object from the center of rotation. In particular, the greater the distance the object is from the center of the rotation, the greater the centripetal and the centrifugal force. Thus as shown in FIG. 7, since IMU 320 is at a greater distance from the center point 105 than IMU 310, IMU 320 experiences a centrifugal force F2 that is greater than a centrifugal force F1 experienced by IMU 310. Since acceleration is proportional to force, the accelerator 324 measures an acceleration greater than accelerator 314.

As another way to visualize the effect, FIG. 7 shows that IMU 320 travels for a greater distance d2 than a distance d1 traveled by the IMU 310 during the same time while rate table 710 is being rotated by α_z. During this time, IMU 320 also experiences more changes in direction (and therefore more changes in velocity) while curving along the rate table 710 than IMU 310. Therefore, accelerator 314 and accelerator 324 measure different magnitudes in total linear acceleration, while gyroscope 312 and gyroscope 322 measure the same magnitudes for total rotational angle and/or total angular velocity. Although, for simplicity, FIG. 7 shows a pure rotational motion about a single axis, in other instances a motion of the user 100 may further include rotations about multiple axes, or further include linear motions along one or more axes. Nonetheless, with respect to measurements of the IMUs, the same principle applies.

Thus, in one aspect, detecting whether the first earbud 110 and second earbud 120 are being worn by the same user ("normal state") or by different users ("shared state") may be based on measurements of angular motions by the first earbud 110 and the second earbud 120. For instance, processors 112 may receive sensor signals from gyroscope 312 and processors 122 may receive sensor signal from gyroscope 322. In this regard, sensor signals of gyroscope 312 may be provided with timestamps by clock 119, and sensor signals of gyroscope 322 may be provided with timestamps by clock 129. As such, the sensor signals may be a time-based series.

Figure 8:
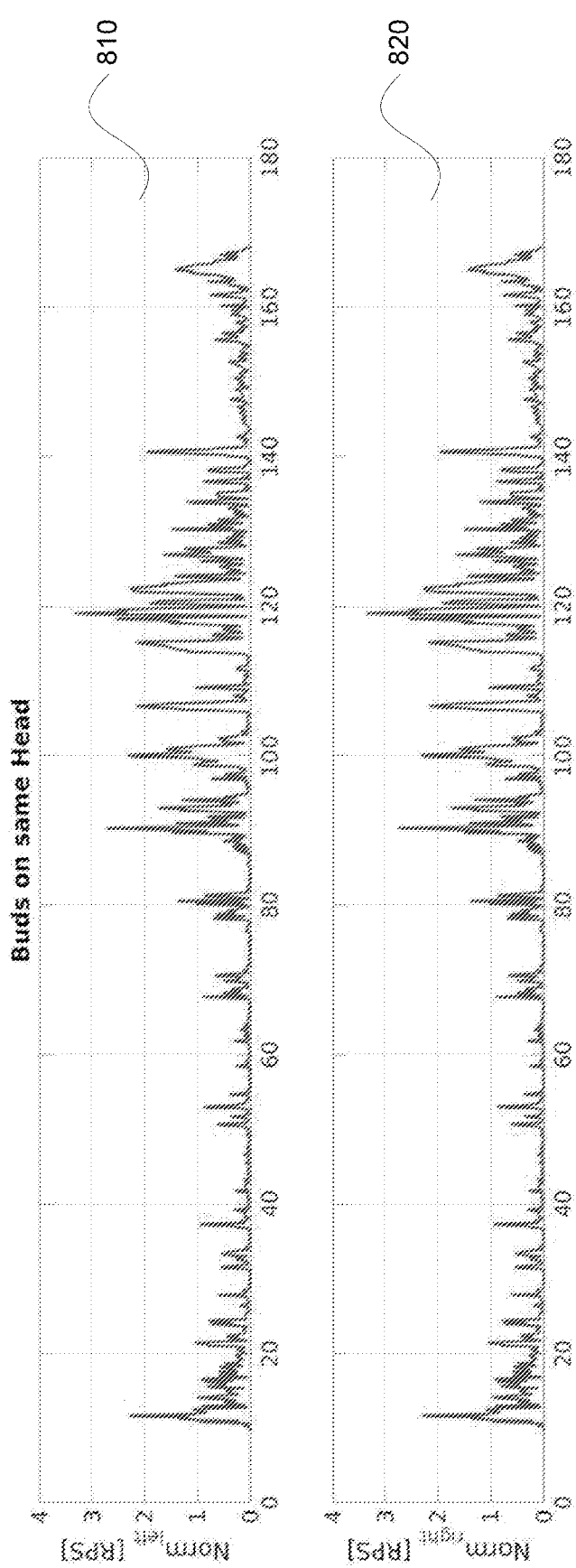
FIG. 8 show graphs illustrating example angular velocities measured by the example pair of earbuds in accordance with aspects of the disclosure.

FIG. 8 illustrates example sensor signals received by processors 112 and/or 122 from the gyroscopes 312, 322 when the two wireless earbuds 110, 120 are being worn by the same user. As shown, the graph 810 and graph 820 each plot a norm (or magnitude) of total angular velocity in revolutions per second, against time in seconds. In this regard, for example, $\text{Norm}_{left}(\omega)=\text{sqrt}(\omega\_x''^2+y''^2+z''^2)$, and $\text{Norm}_{right}(\omega)=\text{sqrt}(\omega\_x'^2+\omega\_y'^2+\omega\_z'^2)$, where ω_x" is angular velocity about x"-axis, ω_y" is angular velocity about y"-axis, and so on. For example, graph 810 shows example norm values of angular velocities measured by gyroscope 312 for 180 seconds, while graph 820 shows example norm values of angular velocities measured by gyroscope 322 for 180 seconds. As shown, gyroscopes 312, 322 are highly sensitivity to movements. Further as shown, since earbuds 110, 120 are being worn by the same user, graph 810 and graph 820 show very similar angular velocity measurements.

Figure 9A:
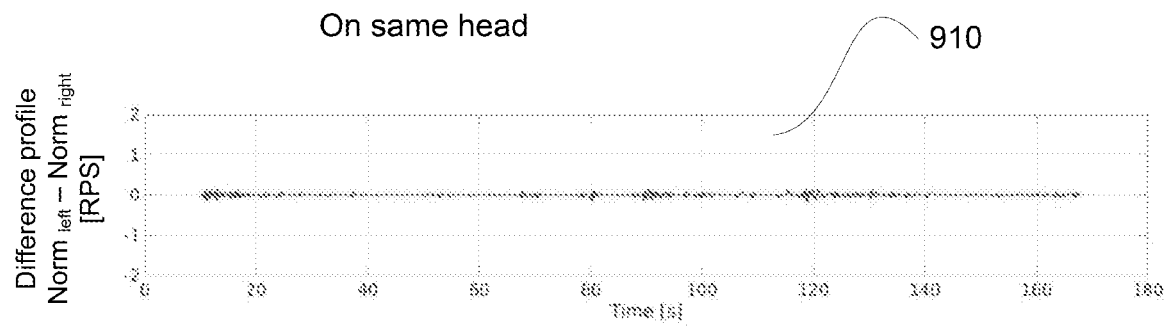
FIGS. 9A and 9B are graphs showing example difference profiles of angular velocities measured by the example pair of earbuds in accordance with aspects of the disclosure.
Figure 9B:
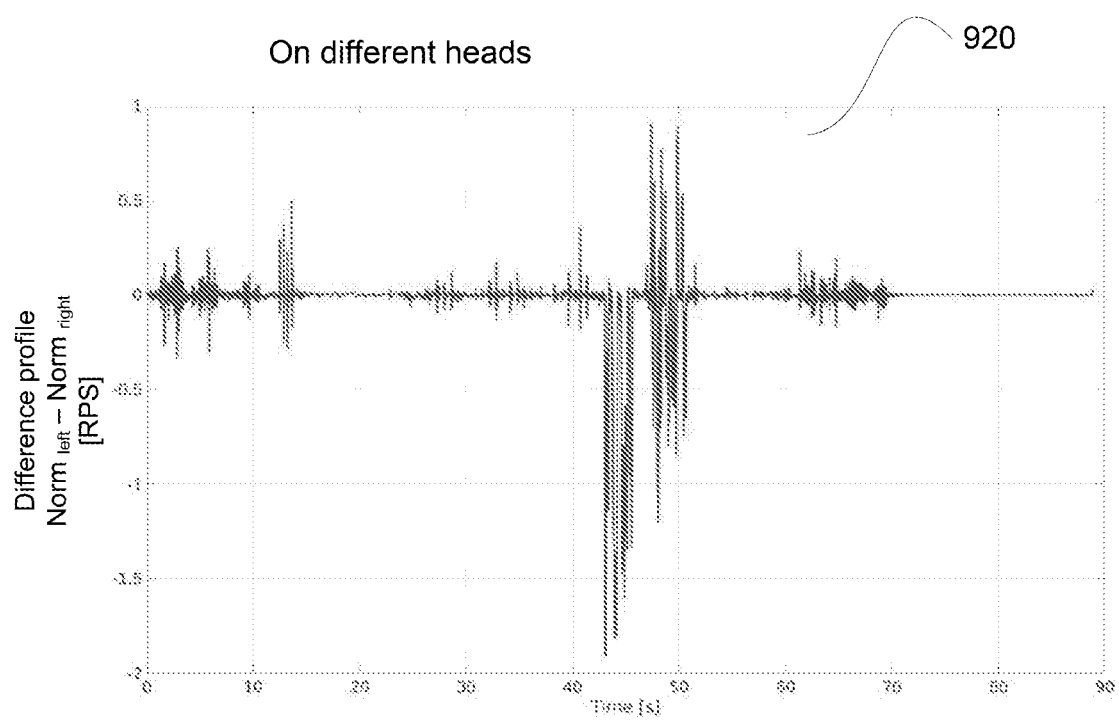

Once sensor signals are received from the two gyroscopes, the sensor signals may be compared by the processors 112 and/or 122. FIGS. 9A and 9B show example difference profiles for sensor signal received from two gyroscopes in two earbuds during a same time period. For instance, FIG. 9A shows a graph 910 plotting a difference profile when both earbuds 110, 120 are being worn by a same user. For example, the difference profile may be computed by subtracting norm values of angular velocities measured by gyroscope 322 from norm values of angular velocities measured by gyroscope 312. For example, each value in graphs 810 and 820 may have a timestamp (which may be synchronized as described below), and the difference profile may be computed by subtracting each value on graph 820 from a corresponding value on graph 810, where the two corresponding values have timestamps closest in time. As shown, the difference profile in graph 910 have values very close to 0. In contrast, FIG. 9B shows a graph 920 plotting a difference profile when the two wireless earbuds 110, 120 are being worn by different users. As shown, the difference profile in graph 920 show various peaks.

As such, based on the comparison of sensor signals from the two gyroscopes 312, 322, processors 112 and/or 122 may determine whether the two wireless earbuds 110 are being worn by the same user or different users. For instance, processors 112 and/or 122 may compare the difference profile to one or more predetermined threshold differences. For example, values in a difference profile meeting a predetermined threshold difference may indicate that the wireless earbuds 110, 120 are being worn by different users. However, many factors such as noises, unsynchronized timestamps, and weak signals, may result in detection of false positives. As such, sensor signals received from gyroscopes 312, 322 may be processed and analyzed before determinations can be made based on differences in the sensor signals.

Figure 10:
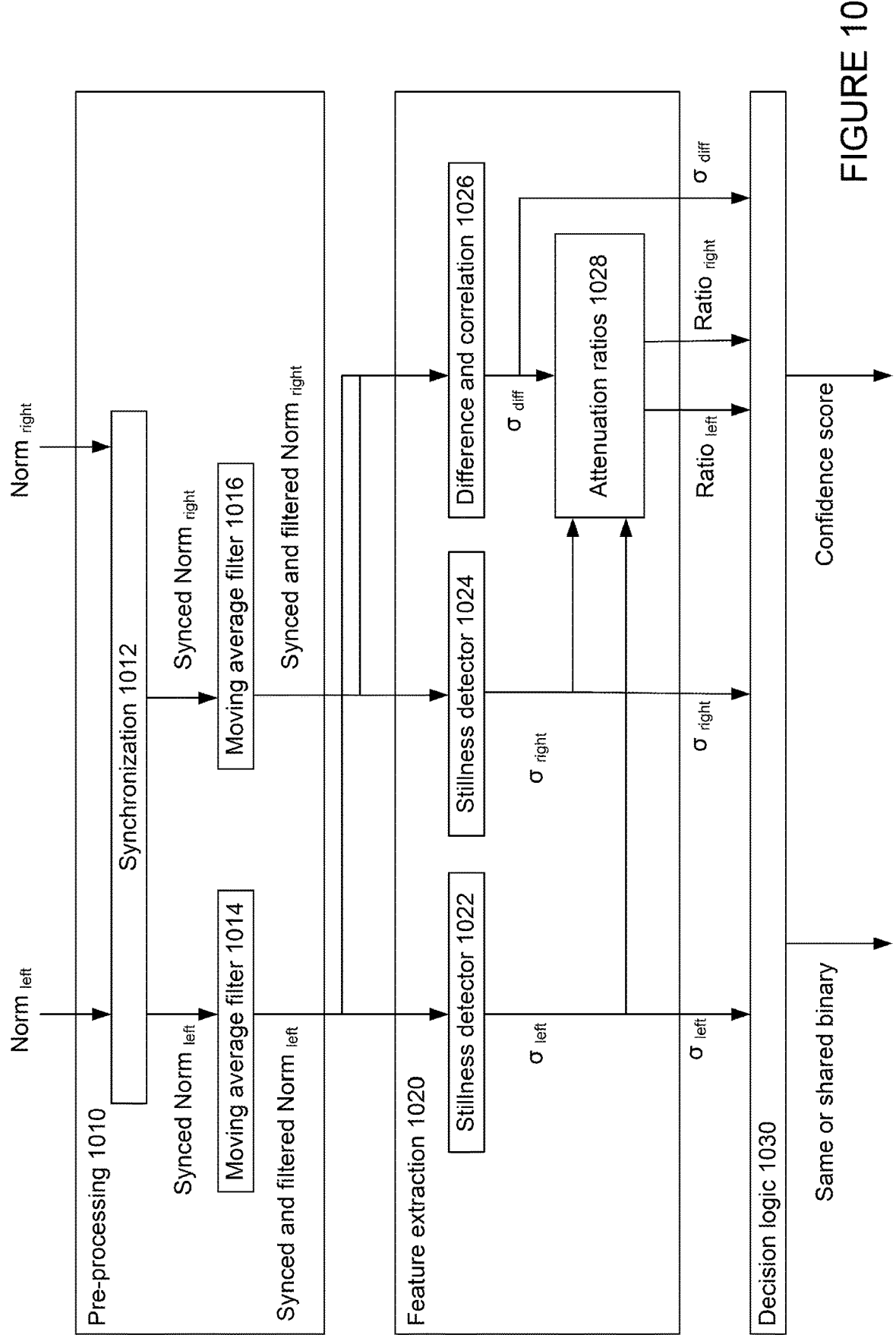
FIG. 10 is a block diagram showing example framework for analyzing sensor signals in accordance with aspects of the disclosure.

In this regard, FIG. 10 is a block diagram showing example signal processing blocks for analyzing sensor signals and determining whether the wireless earbuds 110, 120 are being worn by the same user. The signal processing blocks may be stored as instructions, for example in memory 114 and/or memory 124, and may be performed by processors 112 and/or 122. In some examples, earbud 120 may act as a slave and transmits sensor signals from gyroscope 322 to earbud 110, while earbud 110 may act as a master, whose processors 112 may process and analyze sensor signals from both gyroscope 312 and 322, and determine whether the wireless earbuds 110, 120 are being worn by the same user. In other examples, processors 112, 122 of the two wireless earbuds 110, 120 may both perform some functions shown in FIG. 10.

As shown, the signal processing blocks may include a pre-processing block 1010, a feature extraction block 1020, and a decision logic block 1030. Although FIG. 10 shows an example order of the various blocks, in other examples the blocks may be arranged in a different order.

Referring to the pre-processing block 1010, raw sensor signals, such as norm values of angular velocities measured by gyroscope 312 and gyroscope 322, may be received by processors 112 and/or 122. In this regard, the norm values may be received in batches, such as values collected within a short period of time (e.g. 1 second period). For example, processors 112 and/or 122 may receive a pair of batches, a batch including norm values of angular velocities for the first earbud 110 for a time period ($\text{Norm}_{left}$), and a corresponding batch including norm values of angular velocities for the second earbud 120 for the same time period (Norm- $_{right}$). Each norm value within a batch may include a timestamp indicating when the value was measured. Further, in some instances each batch may also include a batch number or batch timestamp. For example, a batch number and/or batch timestamp for a batch from the earbud 110 may correspond to a batch number and/or batch timestamp for a batch from the earbud 120, thus indicating that the two batches are to be analyzed as a pair. As mentioned above, although the two batches of sensor signals may be compared by comparing corresponding values from each batch having the closest timestamps, in instances where clock 119 and clock 129 may not be synchronized, such comparison may result in inaccuracies.

Accordingly, processors 112 and/or 122 may synchronize measurements from the two wireless earbuds 110, 120 at a synchronization block 1012. As mentioned above, the wireless earbuds 110, 120 may each have one or more processors 112, 122, one or more IMU units 310, 320, and other sensors 115, 125. These various components may have timestamps generated by different clocks, which may have different time bases due to differences in their oscillation or ticking rates, and/or offsets. For example, processors 112, 122 may use timestamps from MCU clocks, IMU units 310, 320 may use timestamps from IMU clocks, and communication modules 117, 127 may use timestamps from one or more clocks in Bluetooth modules. Thus, a reference time may be provided to synchronize the different time bases.

As an example, for truly wireless earbuds, in order to provide synchronized audio, algorithms may already be provided to ensure that the time base for communication modules 117, 127 of the two wireless earbuds 110, 120 are synchronized to each other. Thus, a first Bluetooth module in wireless earbud 110 may have a first Bluetooth clock (such as the master clock mentioned above in Example systems) providing a common time base as a second Bluetooth clock on a second Bluetooth module (such as the estimated clock mentioned above in Example systems) in wireless earbud 120. Further, to ensure the quality of audio, the clocks in Bluetooth modules of the wireless earbuds 110, 120 may have higher quality oscillators, such as crystal oscillators, than oscillators in clocks in other components of the wireless earbuds 110, 120. As such, in synchronization block 1012, timestamps from other clocks of each wireless earbud 110, 120, such as the IMU clocks and MCU clocks, may be synchronized to the time base of the respective first and second Bluetooth clocks. For example, the timestamps for $Norm_{left}$ may be corrected to the time base of the first Bluetooth clock in wireless earbud 110 and timestamps for $Norm_{right}$ may be corrected to the time base of the second Bluetooth clock in wireless earbud 120.

Figure 11:
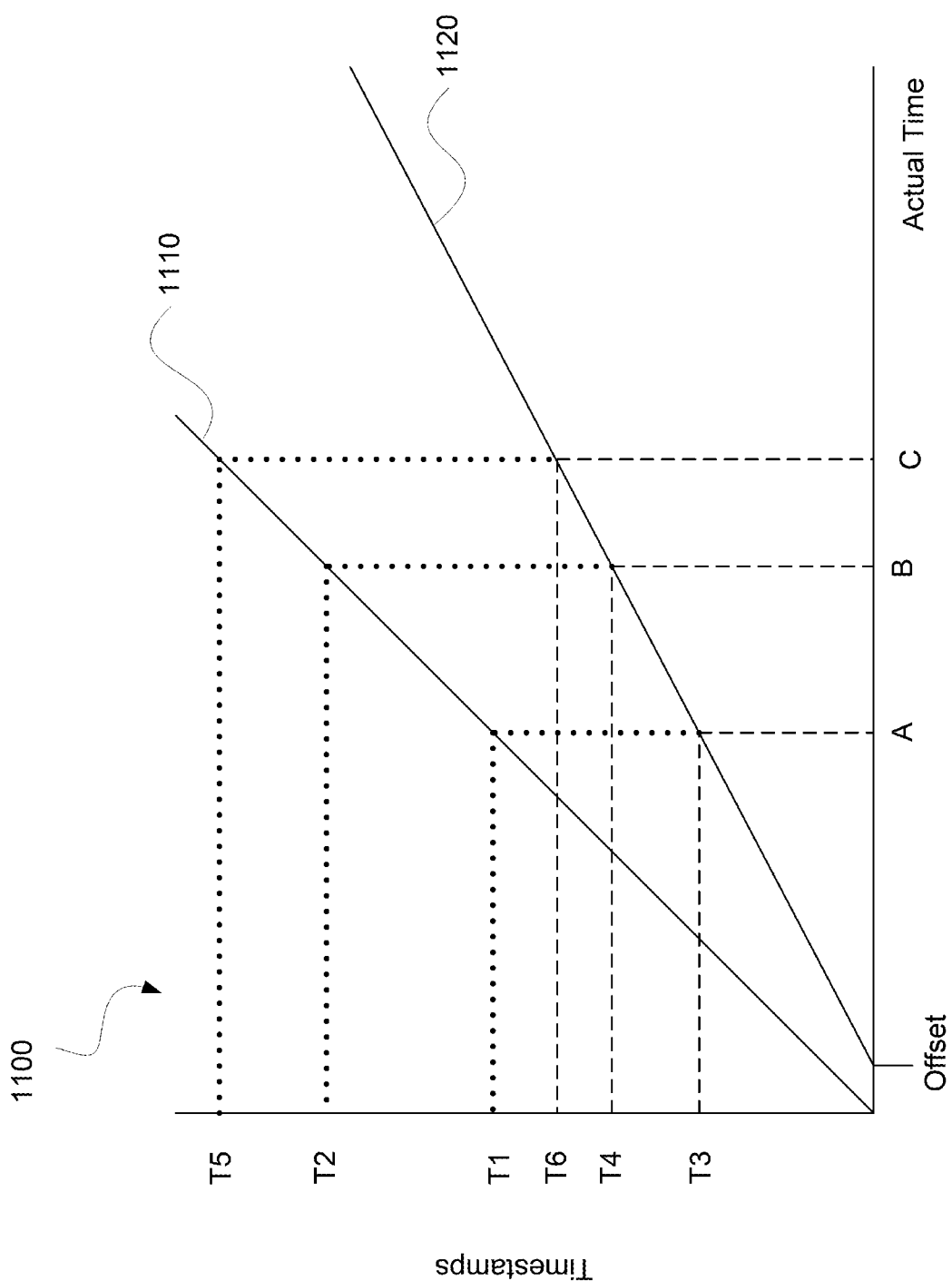
FIG. 11 is a graph illustrating example synchronization of timestamps from different clocks in accordance with aspects of the disclosure.

FIG. 11 shows a graph 1100 illustrating synchronizing a source clock to a target clock, which may be performed by processors 112, 122 at the synchronization block 1012. For example, the target clock may be the first Bluetooth clock (such as the master clock) of earbud 110, and the source clock may be the IMU clock of earbud 110. Other clocks in earbuds 110, 120, including the MCU clocks, may be synchronized in the same manner as described below. As shown, timestamps from the first Bluetooth clock of earbud 110 is plotted as line 1110, and timestamps from the IMU clock of earbud 110 is plotted as line 1120. For example, line 1120 may represent timestamps for $Norm_{left}$. Note that, although the graph shows timestamps on vertical axis against actual time on horizontal axis, for the purposes of synchronization and determining shared/normal state of the earbuds 110, 120, actual time need not be determined, it is only required that the timestamps from different clocks are synchronized to a common time base for making comparison and correlation. For instance, this common time base may be either the time base of the target clock or the time base of the source clock, even if that time base does not reflect actual time.

To synchronize, a relative rate between the clocks and an offset between the clocks may be determined. For example as shown, line 1110 and line 1120 have different slopes as a result of the first Bluetooth clock and the IMU clock of earbud 110 "ticking" at different rates. Further as shown, the two lines 1110 and 1120 have an offset as a result of the first Bluetooth clock and the IMU clock of earbud 110 having different starting values. In this regard, using known timestamps from the two clocks and a relationship such as $T_{target}=T_{source}$*(relative rate)+offset, relative rate and offset may be determined. For example, relative rate=(T2−T1)/(T4−T3), where T1 and T3 are known to be captured at or about a same time A, and T2 and T4 are known to be captured at or about a same time B. As another example, if period for the ticks are known for each clock, it can be estimated that relative rate=$Period_{source}$/$Period_{target}$. Further, offset between the first Bluetooth clock and the IMU clock may be determined using the relationship offset=T2−(T4*relative rate).

In some instances, an appropriate interval may need to be selected before determining relative rate and offset. For instance, if the interval between T1 and T2 and/or the interval between T3 and T4 are too small, the relative rate determined may not be accurate. For example, this may occur when the interval is smaller or comparable to the ticking period of either clock. In contrast, if the interval between T1 and T2 and the interval between T3 and T4 are too large, the clocks may have drifted due to external factors, such as temperature, glitches, system reboot, etc. As such, thresholds for the appropriate interval may be selected based on experimentation and ticking periods of the clocks. For example, if the ticking period of the first Bluetooth clock is approximately 300 µs and the ticking period of the IMU clock is approximately 1000 µs, an interval of 500 ms or greater may be selected for determining relative rates.

Once the relative rate and offset are determined between the source clock and the target clock, timestamps from the source clock can be synchronized to the time base of the target clock. For example as shown in FIG. 11, when a new timestamp T6 is generated by the IMU clock for earbud 110, such as for a value of $Norm_{left}$, T6 may be synchronized to the time base of the first Bluetooth clock of earbud 110 with the relationship T6(synch)=T6*relative rate+offset. This T6(synch) should have the same value as T5 generated by the first Bluetooth clock. Further as described above, since the first Bluetooth clock of earbud 110 is already on the same time base as the second Bluetooth clock (such as the estimated clock mentioned above) of earbud 120, to make sure that $Norm_{left}$ and $Norm_{right}$ have synchronized timestamps on the same time base, timestamps for $Norm_{left}$ can be synchronized using the relative rate and offset with respect to the first Bluetooth clock, and timestamps for $Norm_{right}$ can be synchronized using the relative rate and offset with respect to the second Bluetooth clock.

Figure 12:
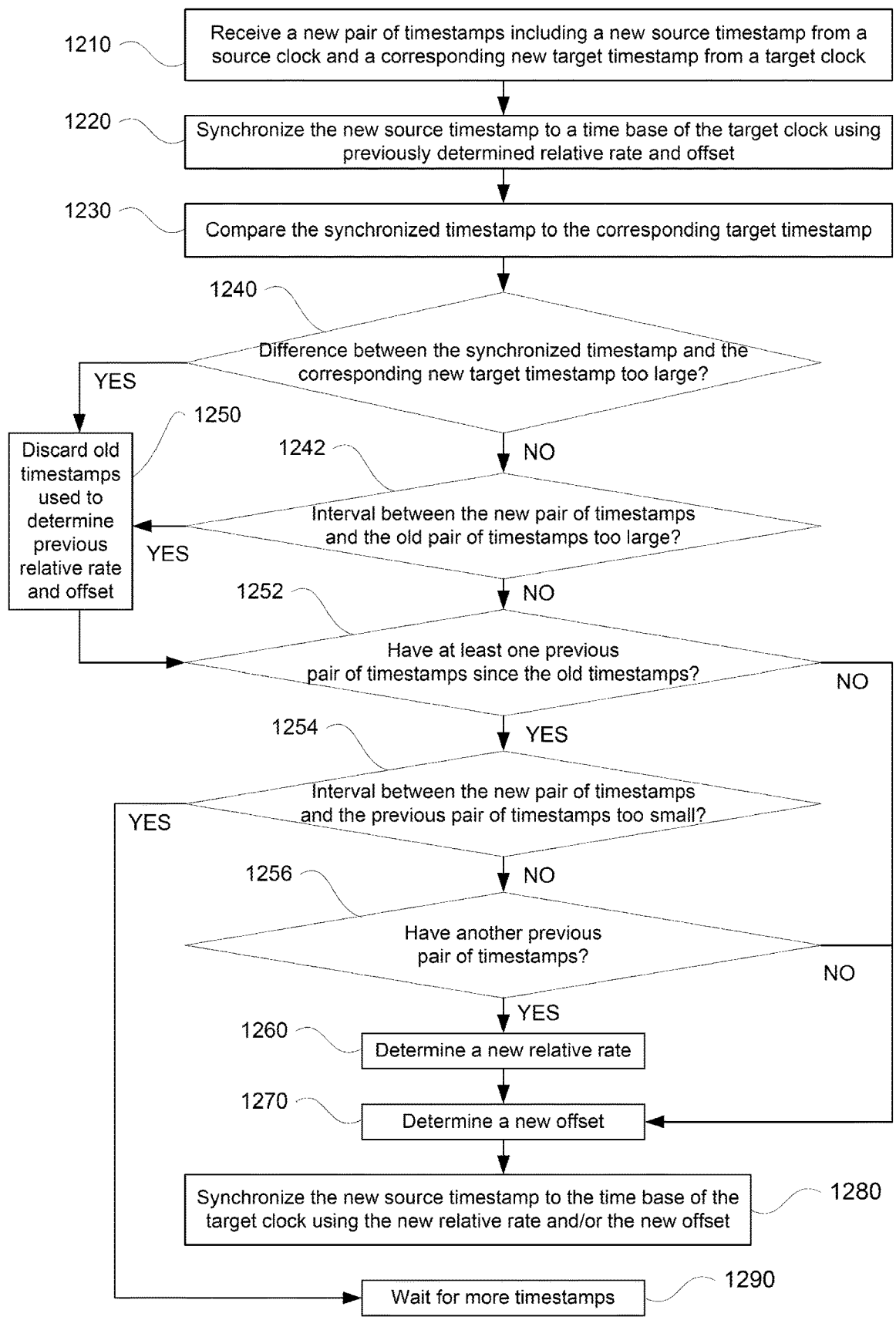
FIG. 12 is a flow diagram showing example synchronization of timestamps from different clocks in accordance with aspects of the disclosure.

Due to any of a number of factors, however, the relative rate and offset between two clocks may drift over time. For example, temperature fluctuations may affect oscillating rate of an oscillator in a clock. As another example, reboot and glitches in the system may also cause changes in ticking rate and offsets. Accordingly, FIG. 12 is a flow diagram for determining how synchronization should be performed when a new pair of timestamps are received. For example, FIG. 12 may be performed by processors 112, 122 at the synchronization block 1012.

Referring to FIG. 12, at block 1210, a new pair of timestamps may be received including a new source timestamp from a source clock and a corresponding new target timestamp from a target clock. For example, the source clock may be the IMU clock of the earbud 110, and the target clock may be the first Bluetooth clock (such as the master clock mentioned above) of earbud 110. The new pair of timestamps may be T5 and T6 of FIG. 11.

At block 1220, the new source timestamp may be synchronized to a time base of the target clock using previously determined relative rate and offset. For instance, the relative rate and the offset between the first Bluetooth clock of earbud 110 and the IMU clock of the earbud 110 may be determined as described with respect to FIG. 11. For example, new source timestamp T6 may be synchronized to the time base of the first Bluetooth clock by T6(synch)= T6*relative rate+offset.

At block 1230, the synchronized timestamp may be compared to the corresponding target timestamp. For example referring to FIG. 11, T6(synch) may be compared with T5.

At block 1240, it is determined whether a difference between the synchronized timestamp and the corresponding target timestamp is too large. In this regard, the difference may be considered too large if it meets a predetermined threshold difference. For example, a difference meeting the predetermined threshold difference may indicate that the target clock and the source clock have drifted sufficiently apart such that the previously determined relative rate and/or offset are no longer accurate. Thus, if yes, in block 1250, old timestamps used for determining the previous relative rate and/or offset may be discarded. For example, timestamps T1, T2, T3, T4 from FIG. 11 may be discarded.

Then at block 1252, it is determined whether there is at least one previous pair of timestamps since the old timestamps. For example, since the relative rate and offset were determined using T1, T2, T3 and T4, one or more pairs of timestamps, e.g., T3' from target clock and T3" from source clock, might have been received before the current new pair of timestamps T5, T6. If yes, at block 1254, it is determined whether the interval between the previous pair of timestamps and the new pair of timestamps are too small. If not, at block 1256, it is determined whether there is another previous pair of timestamps for determining relative rate and offset. For example, there may be another previous pair of timestamps, e.g., T4' from target clock and T4" from source clock, received before the current new pair of timestamps T5, T6.

If yes, at block 1260, a new relative rate is determined using the two previous pair of timestamps. For example, the new relative rate=(T4'−T3')/(T4"−T3"). Then, at block 1270, a new offset may be determined using the new relative rate and the two previous pair of timestamps. For example, the new offset=T4"−(T4'*new relative rate). As such, at block 1280, the new target timestamp may then be synchronized using the new relative rate and the new offset.

Refer back to block 1256, if there is no other previous pair of timestamps, then only a new offset is determined at block 1270. For example, the new offset=T6−(T3"*previous relative rate). At block 1290, the system waits for new timestamps for calculating new relative rate.

Similarly at block 1252, if there is no previous pair of timestamps at all, only a new offset is determined at block 1270, and the system waits for new timestamps at block 1290.

Refer back to block 1254, if the interval is too small, then the system waits for new timestamps at block 1290. For example as described above, determining relative rate and offset using timestamps having small intervals may result in inaccuracies.

However, if at block 1240 it is determined that the difference between the synchronized timestamp and the corresponding target timestamp is not too large, at block 1242, it may be determined whether the interval between the new timestamps and the old timestamps is too large. If not, the system may continue to block 1252 without discarding the old timestamps. If yes, the system may continue to block 1250 as described above. For instance, even if the difference may not yet be too large, it may be good practice to discard old timestamps used to determine previous relative rate and offset if a long time has passed. For example, a predetermined time period, such as a week or a day, may be set so that old timestamps are discarded.

Although FIG. 12 describes one example processing of new pair of timestamps, in other examples new pair of timestamps may be processed differently. For example, some decision blocks may be skipped, new decision blocks may be added, different thresholds and order may be used, etc.

Returning to FIG. 10, processors 112 and/or 122 may perform other types of pre-processing of the sensor signals, such as filtering. As mentioned above, sensor signals received from gyroscopes 312, 322 may include noise. As such, processors 112 and/or 122 may use filters, such as moving average filters 1014, 1016, to filter noise from the synchronized signals.

Once the sensor signals are pre-processed, processors 112 and/or 122 may extract features from the pre-processed sensor signals at the feature extraction block 1020. For instance, processors 112 and/or 122 may compare the sensor signals from gyroscope 312 and gyroscope 322 using the difference and correlation block 1026. For instance, processors 112 and/or 122 may subtract the pre-processed batch of norm values from gyroscope 322 from the corresponding pre-processed batch of norm values from gyroscope 312 to generate a difference profile (similar to those shown in FIGS. 9A-9B). For example, since the two batches of norm values from gyroscopes 312 and 322 are already synchronized to a common time base at block 1012, the difference profile may be computed by subtracting each value in the pre-processed batch from gyroscope 322 from a corresponding value in the pre-processed batch from gyroscope 312, where the two corresponding values have synchronized timestamps closest in time. Further as shown, processors 112 and/or 122 may determine signal metrics for the difference profile, such as a standard deviation ($\sigma_{diff}$) of the difference profile.

Additionally or alternatively, in some instances processors 112 and/or 122 may correlate the pre-processed batch of norm values from gyroscope 312 with the corresponding pre-processed batch of norm values from gyroscope 322. For example, the batch of norm values from gyroscope 322 may be shifted to one or more time delays, and compared with the batch of norm values from gyroscope 312 in order to determine correlations between the two batches. Such time-based correlations may be used in situations where the user's head 103 can no longer be approximated as a rigid body, such as when facial expressions result in asymmetrical facial movements, when activities such as running and jumping cause muscles on the head to bounce asymmetrically, or when gestures affect only one of the wireless earbuds (or affect the two wireless earbuds differently), etc.

As shown in the feature extraction block 1020, processors 112 and/or 122 may perform additional analyses. For instance, some batches of sensor signals from gyroscopes 312, 322 may be too weak for making reliable detections of shared state. As such, processors 112 and/or 122 may use stillness detectors 1022 and 1024 to determine signal metrics, such as mean, standard deviation, variance, etc., for the pre-processed batches of sensor signals. For example as shown, stillness detector 1022 may be used to determine a standard deviation ($\sigma_{left}$) for the batch of sensor signals received from gyroscope 312, and stillness detector 1024 may be used to determine a standard deviation ($\sigma_{right}$) for the batch of sensor signals received from gyroscope 322. As described further below, these signal metrics may later be used to determine whether a batch of sensor signals is sufficiently strong for detecting shared state.

Processors 112 and/or 122 may further determine attenuations for the corresponding pre-processed batches of sensor signals. Referring to the attenuation block 1028, attenuation ratios may be determined based on the signal metrics determined in blocks 1022, 1024, and 1026. For instance, an attenuation ratio may be determined for the batch of sensor signals from gyroscope 312 based on comparing its standard deviation with the standard deviation of the difference profile. For example, the attenuation ratio may be expressed as $Ratio_{left} = \sigma_{left}/\sigma_{diff}$. Similarly, an attenuation ratio may be determined for the batch of sensor signals from gyroscope 322, expressed as $Ratio_{right} = \sigma_{right}/\sigma_{diff}$. As discussed further below, these attenuation ratios may be used to detect shared states.

Once the features are extracted from the sensor signals, processors 112 and/or 122 may use the features to detect shared state at the decision logic block 1030. For instance, referring to FIGS. 9A and 9B, where earbuds 110, 120 are being worn by the same user, the difference profile have values close to 0, and thus $\sigma_{diff}$ may have a small value; in contrast, where earbuds 110, 120 are being worn by different users, the difference profile have peaks of values, and thus $\sigma_{diff}$ may have a large value. As such, attenuation ratios such as $Ratio_{left}$ and $Ratio_{right}$ may have large values when earbuds 110, 120 are worn by a same user, and small values when earbuds 110, 120 are worn by different users. Thus, in some instances, processors 112 and/or 122 may compare the $Ratio_{left}$ and/or $Ratio_{right}$ with a predetermined threshold, and determine whether the wireless earbuds 110, 120 are being worn by different users based on whether the $Ratio_{left}$ and/or $Ratio_{right}$ meet the predetermined threshold. In other instances, processors 112 and/or 122 may first determine a sum of the attenuation ratios for the two wireless earbuds 110, 120, such as $Ratio_{sum} = sqrt(Ratio_{right}^2 + Ratio_{left}^2)$, and determine whether the wireless earbuds 110, 120 are being worn by different users based on the $Ratio_{sum}$ meeting the predetermined threshold.

Additionally or alternatively, processors 112 and/or 122 may further generate a confidence score of whether the wireless earbuds 110, 120 are being worn by different users. In this regard, processors 112 and/or 122 may generate the confidence score based on a comparison with one or more metrics for uncorrelated noise. For example, the confidence score may be based on a comparison to a standard deviation of a Gaussian function, or $1/sqrt(2)$, which represents perfectly uncorrelated noise. Further, the confidence scores may be generated such that they fall with a predetermined range, such as between 0 and 1. For example, processors 112 and/or 122 may scale the $Ratio_{sum}$ by a scaling parameter, which may be a constant. The scaling parameter may be selected based on experimentation such that, when multiplied by the scaling factor, $Ratio_{sum}$ signals of signals generated by the system remain within an upper bound of 1. As a particular example, the confidence score may be generated using the expression: confidence score=sqrt [($Ratio_{sum}$−1/sqrt(2))*scaling parameter].

Processors 112 and/or 122 may perform additional analyses at the decision logic block 1030. For instance, processors 112 and/or 122 may determine, based on the standard deviations $\sigma_{left}$, $\sigma_{right}$, whether the batches of sensor signals from gyroscope 312, 322 are sufficiently strong to detect share state. For example, processors 112 and/or 122 may determine whether the batches of sensor signals are sufficiently strong based on whether the standard deviations $\sigma_{left}$, $\sigma_{right}$ are within a predetermined quality threshold. Weak signals may be indicated by standard deviations being below a predetermined low threshold. On the other hand, too much fluctuation in the signals (standard deviation above a predetermined high threshold) may also make the signals unsuitable for shared state detection. In some instances, if processors 112 and/or 122 determine that the batches of sensor signals are not sufficiently strong or fluctuate too much, processors 112 and/or 122 may wait and/or request for next batches of sensor signals.

Further, processors 112 and/or 122 may compare the confidence score with one or more predetermined confidence thresholds. For example, processors 112 and/or 122 may determine based on a confidence score below a first confidence threshold as indicating that the wireless earbuds 110, 120 are being worn by the same user. As another example, processors 112 and/or 122 may determine based on a confidence score above a second confidence threshold as indicating that the wireless earbuds 110, 120 are being worn by different users. As still another example, processors 112 and/or 122 may determine based on a confidence score falling between the first confidence threshold and the second confidence threshold as indicating that additional sensor signals and/or analyses may be needed.

In some instances, processors 112 and/or 122 may be configured to first determine whether the wireless earbuds 110, 120 are being worn by the same user based on difference profiles and other signal metrics, such as the attenuation ratios. If the confidence score is below the first threshold (e.g., confident on same user) or above the second threshold (e.g., confident on different users), processors 112 and/or 120 may not determine correlations of the sensor signals at block 1026. However, if the confidence score is between the first threshold and the second threshold, processors 112 and/or 122 may be configured to determine correlations between the sensor signals from earbud 110 and earbud 120. This ensures that correlations, which may be computation intensive, are not always performed, which may in turn increase efficiency of the system.

In other instances, though not shown in FIG. 10, when the confidence score is between the first threshold and the second threshold, processors 112 and/or 122 may be configured to use secondary data for detecting whether the wireless earbuds 110, 120 are in a shared state. For instance, processors 112 and/or 122 may receive data from the communication modules 117, 127. For example, the data may include information on a communication link, such as a Bluetooth link, formed between the first earbud 110 and the second earbud 120. As an example, processors 112 and/or 122 may receive a power measurement (Power $T_x$) when earbud 110 is transferring data to earbud 120 through the communication link, and a power measurement (Power) when earbud 110 is receiving data from earbud 120 through the communication link. Processors 112 and/or 122 may compare the power measurements, such as determining an attenuation for the link: $\text{Attenuation}_{link}=\text{Power}_{RX}/\text{Power}_{TX}$. For instance, $\text{Attenuation}_{link}=1$ for a perfect link, but $\text{Attenuation}_{link}$ may decrease as a distance between the wireless earbuds 110, 120 increases. As such, processors 112 and/or 122 may determine whether the wireless earbuds 110, 120 are being worn by a same user based a value of $\text{Attenuation}_{link}$, such as whether $\text{Attenuation}_{link}$ meets a predetermined threshold. Consideration of secondary data may help reduce the number of false positives.

Processors 112 and/or 122 may also be configured to receive data indicating face movements of the user 100. For example, gyroscopes 312, 322 may be configured to measure Euler angles, which describe the orientation of a rigid body (such as user's head 103) with respect to a fixed coordinate system. Based on the orientation of the user's head 103, processors 112 and/or 122 may determine whether the user's face is moving asymmetrically, or if the user 100 is doing an activity such as running. Such movements may result in different angular velocity measurements by the two earbuds 110, 120, even though the two earbuds 110, 120 may be worn by the same user 100. Processors 112 and/or 122 may further determine whether the earbuds 110, 120 are being shared after factoring such movements.

Processors 112 and/or 122 may further be configured to receive data from the user inputs 111 and/or 121. For example, the data may be sensor signals from touch sensor(s), such as capacitive sensor(s), optical sensor(s), for detecting touch inputs by the user. Adjusting positioning of the wireless earbuds 110, 120, and/or touch gestures such as tap, double tap, swipes, etc. are unlikely to be performed on both wireless earbuds 110, 120 at the same time. And even when performed on both wireless earbuds 110, 120 at the same time, may not be performed symmetrically. Thus, such adjustments and/or gestures may result in different angular velocity measurements by the two wireless earbuds 110, 120, even when the two wireless earbuds 110, 120 are being worn by the same user 100. For instance, processors 112 and/or 122 may receive sensor signals from touch sensors indicating that the user is touching or adjusting the wireless earbuds 110, 120, and as such, determine that differences in sensor signals from IMUs may result from the touching/adjustments, and not as a result of being worn by different users. Consideration of such secondary data may help reduce the number of false positives.

Alternatively or additionally, processors 112 and/or 122 may be configured to receive acceleration signals indicating position adjustments and/or touch gestures of the user 100. For example, some positioning adjustments and/or gestures may not be detected by the touch sensor(s) described above (e.g., touching an area not covered by the touch sensor, very slight movements, movements not corresponding to any input command). In this regard, the adjustments and/or touch gestures may be detected using acceleration signals from the one or more accelerometers 314, 324. In some instances, the acceleration signals may be filtered by a high-pass filter to eliminate low frequency acceleration signals due to gravity and other body motion, resulting in high frequency acceleration signals (such as spikes and high energy signals) that are indicative of touch gestures. Once position adjustments and/or touch gestures are detected, processors 112 and/or 122 may be configured to not use the angular velocity measurements while the adjustments and/or touch gestures are detected in order to reduce false positives.

Figure 13:
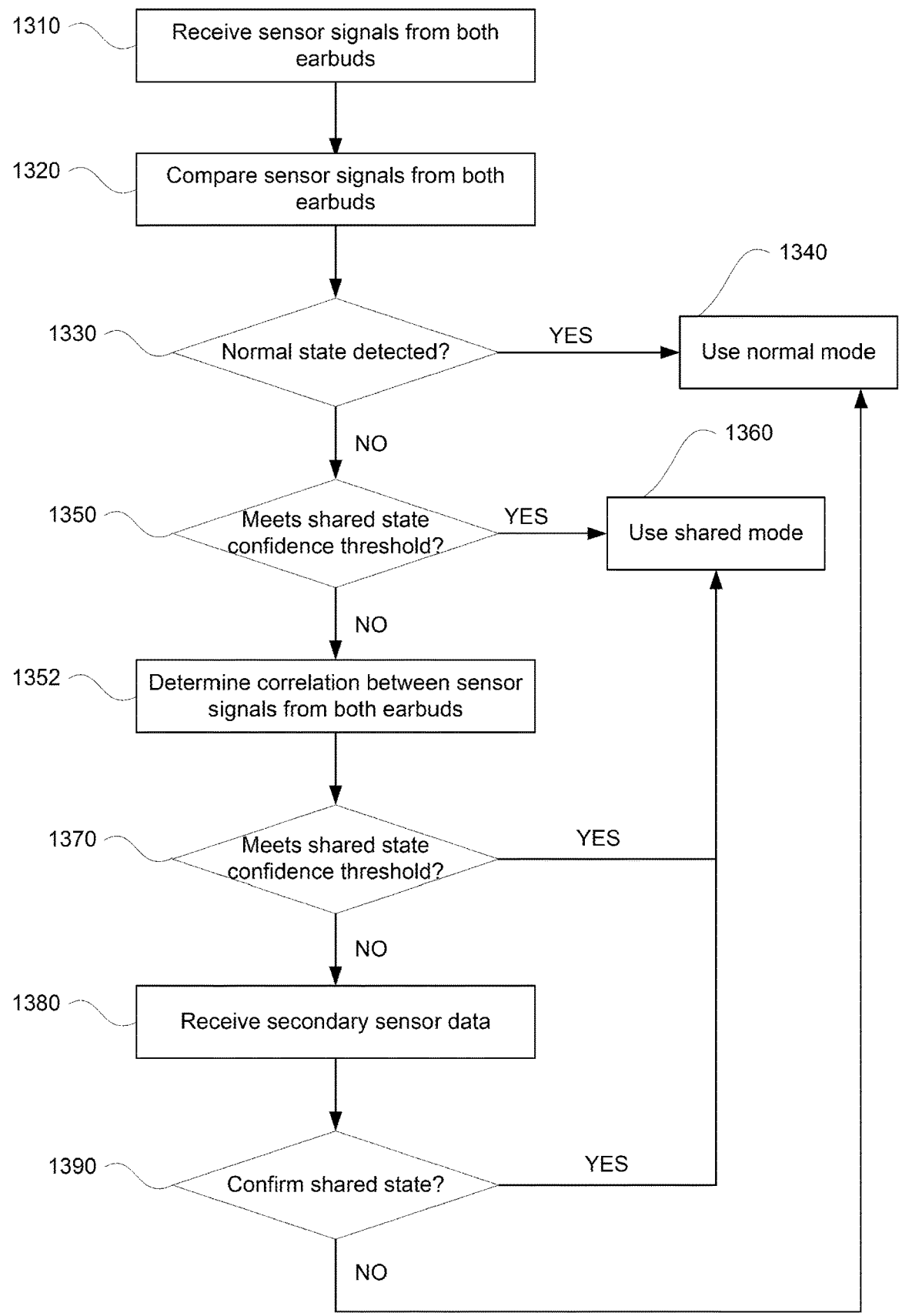
FIG. 13 is a flow diagram showing detection of shared state in accordance with aspects of the disclosure.

FIG. 13 shows an example flow diagram that may be performed by one or more processors, such as one or more processors 112 and/or 122. For example, processors 112 and/or 122 may receive data and make various determinations as shown in the flow diagram. Referring to FIG. 13, at block 1310, sensor signals are received from both earbuds 110, 120, such as norm values of angular velocities measured by gyroscopes 312, 322. For instance, the sensor signals may be received in batches. At block 1320, the sensor signals from both earbuds 110, 120 are compared, such as by determining a difference profile between a batch of sensor signals from gyroscope 312 with a corresponding batch of sensor signals from gyroscope 322. At block 1330, it is determined whether results of the comparison indicates that a normal state is detected where earbuds 110, 120 are being worn by the same user.

If yes, at block 1340, earbuds 110, 120 are controlled to use a normal mode. In this regard, a normal mode may include any of a number of settings. For example, when the wireless earbuds 110, 120 are used for audio broadcasting, the two wireless earbuds 110, 120 may be set to a stereophonic setting in the normal mode. As another example, in the normal mode, audio may be routed from a paired device to the first earbud 110, and then from the first earbud 110 to the second earbud 120. As yet another example, when the wireless earbuds 110, 120 are used for a conference call, in the normal mode one of the two wireless earbuds 110, 120 may be set in a voice canceling setting. Alternatively, each of the two wireless earbuds 110, 120 may be used to identify a different speaker when in the normal mode during a conference call. As still another example, when the wireless earbuds 110, 120 are used for translation, the wireless earbuds 110, 120 may be adjusted to have the same language setting in the normal mode, such as providing audio in the same language.

If not, at block 1350, it is determined whether results from the comparison meets a confidence threshold for detecting a shared state where the wireless earbuds 110, 120 are being worn by different users. For example, the results of the comparison may include a confidence score described with respect to FIG. 10, which may be compared to one or more predetermined confidence thresholds described above.

If yes, at block 1360, the wireless earbuds 110, 120 may be controlled to use a shared mode. In this regard, a shared mode may include any of a number of settings. For example, when the wireless earbuds 110, 120 are used for audio broadcasting, the two wireless earbuds 110, 120 may each be set to a monophonic setting in the shared mode. As another example, in the shared mode, audio may be routed from a paired device to both the first earbud 110 and to the second earbud 120, instead of between the first earbud 110 and the second earbud 120. As yet another example, when the wireless earbuds 110, 120 used for translating a conversation between the two users 100, 200 sharing the wireless earbuds 110, 120, the first earbud 110 may receive audio in a first language from user 200, route the audio to the second earbud 120 worn by the other user 100, the second earbud 120 then translates the audio into a second language and broadcasts it to user 200. In the reverse direction, the wireless earbuds may have the opposite setting.

If not, at block 1352, one or more correlations may be determined between sensor signals from both earbuds. As such, the one or more correlations may be used to further improve confidence level in detection of shared state. As mentioned above, since correlations may be computationally intensive, in this example, by only performing the correlations when detection based on difference profiles are not meeting the desired confidence level, this may increase efficiency of the system. At block 1370, it is determined whether results of the correlation meets a confidence threshold for detecting shared state. This confidence threshold may or may not be the same confidence threshold set for block 1350. If yes, at block 1360, earbuds 110, 120 are controlled to use a shared mode.

If not, at block 1380, secondary data may be received, such as the data on communication link between the wireless earbuds 110, 120 and touch sensor signals described above, As such, the secondary data may be used to further increase accuracy in detection of shared or normal state. Further, in this example, by only receiving and analyzing the secondary data when results based on difference profiles and correlations are not meeting the desired confidence levels, this may increase efficiency of the system. At block 1390, it is further confirmed based on the secondary data whether the wireless earbuds 110, 120 are in a shared state. If yes, at block 1360, earbuds 110, 120 are controlled to use a shared mode. If not, at block 1340, wireless earbuds 110, 120 are controlled to use a normal mode.

Although the flow diagram shows one example of how one set of sensor signals and/or analysis may be a gatekeeper for further analysis, other alternative examples may be used. For instance, in another example secondary sensor signals, such as touch detections indicating user adjustment of earbud positioning, may be used as a gatekeeper before detecting for shared state using sensor signals from gyroscopes. As such, sensor signals from gyroscopes may not be analyzed or even received by processors 112 and/or 122 when it is determined that positioning of one or both earbuds 110, 120 are being adjusted.

Figure 14:
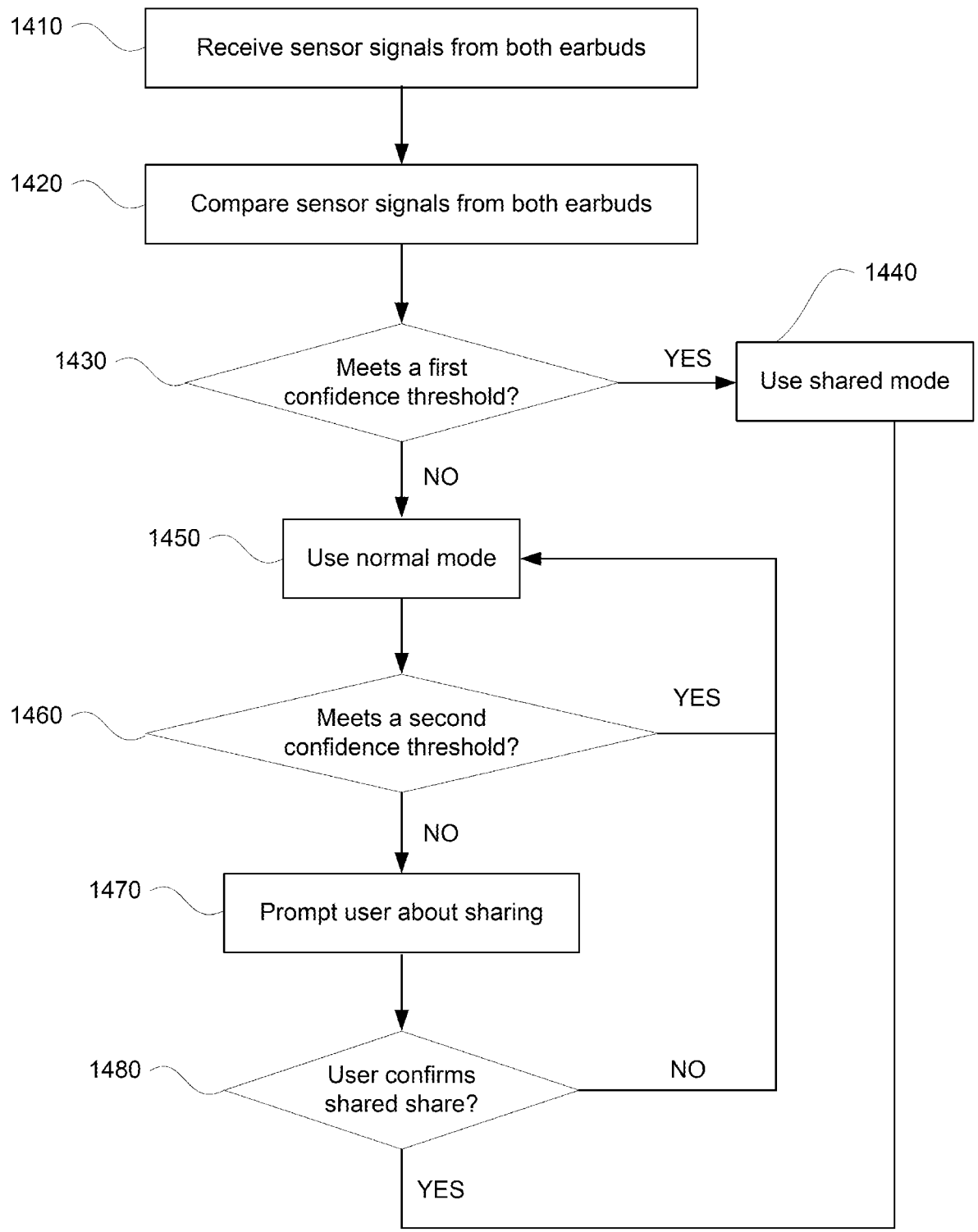
FIG. 14 is another flow diagram showing detection of shared state in accordance with aspects of the disclosure.

FIG. 14 shows another example flow diagram that may be performed by one or more processors, such as one or more processors 112 and/or 122. For example, processors 112 and/or 122 may receive data and make various determinations as shown in the flow diagram. Referring to FIG. 14, at block 1410, sensor signals are received from both earbuds 110, 120, such as norm values of angular velocities measured by gyroscopes 312, 322. At block 1420, the sensor signals from both earbuds 110, 120 are compared, such as by determining a difference profile between a batch of sensor signals from gyroscope 312 with a corresponding batch of sensor signals from gyroscope 322. At block 1430, it is determined whether results of the comparison meets a first confidence threshold, such as a confidence threshold for detecting shared state. If yes, at block 1440, the wireless earbuds 110, 120 may be controlled to use a shared mode.

If not, at block 1450, the wireless earbuds 110, 120 may be controlled to use a normal mode. Then, at block 1460, it is determined whether results of the correlation meets a second confidence threshold, such as a confidence threshold for detecting normal state. If yes, at block 1450, earbuds 110, 120 are controlled to remain in the normal mode.

If not, at block 1470, the user may be asked, such as via a prompt, whether the user would like to enter a shared mode. In this regard, the prompt may be an audio output from earbuds 110, 120, a vibration, a display on another paired device, etc. At block 1480, it is determined, based on an user input, whether the user confirms that a shared mode is desired. If yes, at block 1440, the wireless earbuds 110, 120 are controlled to use a shared state. If not, at block 1450, the wireless earbuds 110, 120 are controlled to remain in the normal mode. As such, the system is configured to assume the more likely state of being worn by the same user, until confirmation is received that the user wants to use a shared mode.

Figure 15:
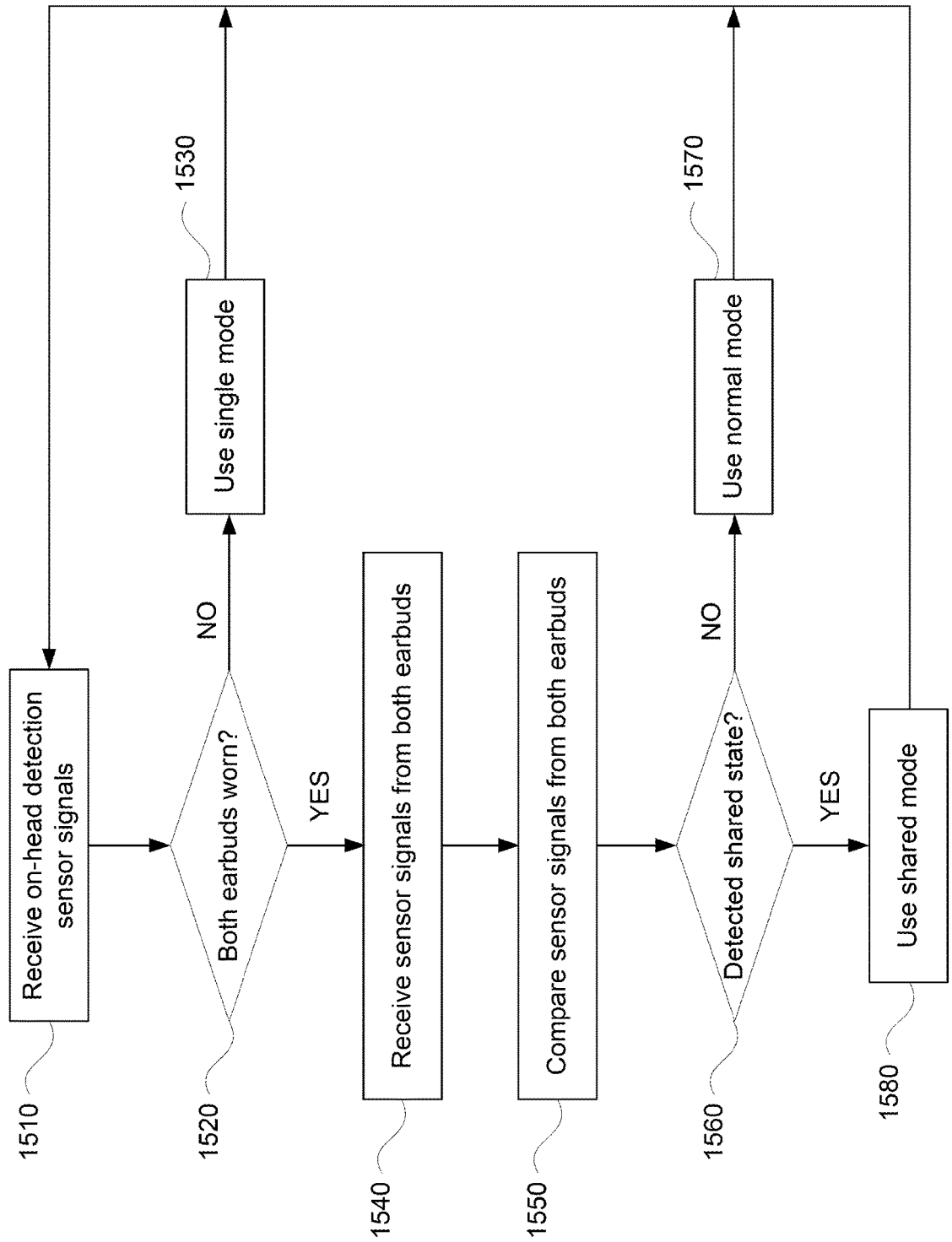
FIG. 15 is another flow diagram showing detection of shared state in accordance with aspects of the disclosure.
Figure 16:
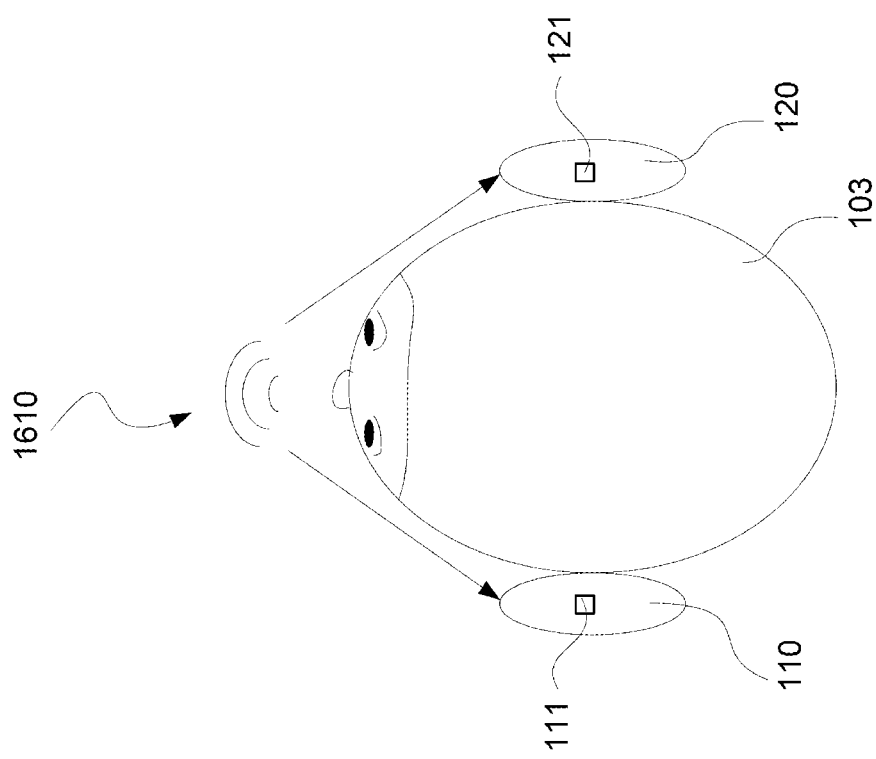
FIG. 16 is a pictorial diagram illustrating an example of detecting shared state using sensor signals from vibration sensors.

FIG. 15 is another flow diagram illustrating another example flow diagram that may be performed by one or more processors, such as one or more processors 112 and/or 122. For example, processors 112 and/or 122 may receive data and make various determinations as shown in the flow diagram. Referring to FIG. 15, at block 1510, on-head detection sensor signals are received. For instance, sensor signals may be received from capacitive sensor(s), optical sensors(s), etc. Such sensor signals may indicate whether one or both of the wireless earbuds 110, 120 are being worn. Thus, at block 1520, it is determined based on the on-head detection sensor signals whether both earbuds are being worn.

If not, at block 1530, earbud 110 or earbud 120 (depending on which one is being worn), is controlled to use a single mode. In this regard, the single mode may have any of a number of settings, for example, for broadcasting audio, single mode may be a monophonic mode. As another example, for audio calls, single mode may not include noise canceling. Thus in this example, shared state detections are not made unless on-head detection indicates that both wireless earbuds 110, 120 are being worn, which may further increase efficiency of the system without sacrificing accuracy.

If yes, at block 1540, sensor signals are received from both earbuds 110, 120, such as norm values of angular velocities measured by gyroscopes 312, 322. At block 1550, the sensor signals from both earbuds 110, 120 are compared, such as by determining a difference profile between a batch of sensor signals from gyroscope 312 with a corresponding batch of sensor signals from gyroscope 322. In some instances, to further increase efficiency, shared state detection may only be made within a predetermined period after on-head detection that both earbuds 110, 120 are being worn. For example, the predetermined period may be a couple of seconds. For example, in order to change from a normal state to a shared state, or vice versa, one or both of the earbuds 110, 120 need to be first removed from one or more user's head. As such, shared states should only follow on-head detection of both earbuds 110, 120 being worn. Thereafter, there should not be any change between shared and normal state until another on-head detection of earbud removal followed by insertion. This therefore improves efficiency of the system without sacrificing accuracy.

At block 1560, it is determined whether results of the comparison indicates that the wireless earbuds 110, 120 are being worn by different users. If not, at block 1570, the wireless earbuds 110, 120 are controlled to use a normal mode. If yes, at block 1580, the wireless earbuds 110, 120 are controlled to use a shared mode.

Although the examples above describe detecting normal or share state of wireless earbuds 110, 120 using sensor signals from gyroscopes 312, 322, additionally or alternatively, sensor signals from other types of sensors 115, 125 may be used. Thus, in another aspect, detecting whether the wireless earbuds 110, 120 are in a normal or shared state can be based on comparing and correlating measurements of linear motion from accelerometers 314, 324. Any of the example implementations details described above, such as synchronizing, filtering, extracting features, decision logics, thresholds, etc., may be used for processing and analyzing other types of sensor signals, including for the example types of sensor signals described below.

FIGS. 16-19 each show determining whether the wireless earbuds 110, 120 are in a normal or shared state additionally or alternatively based on other types of sensor signals. For instance, referring to FIG. 16, a vibration sensor may be included in each wireless earbud 110, 120 to function as a motion sensor. For example, the vibration sensor may be a microphone in user inputs 111, 121 configured to detect a person's voice or breathing pattern 1610. In this regard, when the wireless earbuds 110, 120 are being worn by the same user, both microphones would detect approximately the same magnitude of vibration having approximately the same frequency at or about the same time. In contrast, if the wireless earbuds 110, 120 are being worn by different users, it would be very unlikely that both users would produce approximately the same voice or breathing patterns at or about the same time. For example, one user may have a higher voice or a quicker breathing pattern than the other user. As another example, even if the two users have very similar voices and breathing patterns, they may not speak or breathe completely in sync. Therefore, time-correlations of the two vibration signals from the two vibration sensors would indicate whether the two wireless earbuds 110, 120 are being worn by the same user or different users.

Figure 17A:
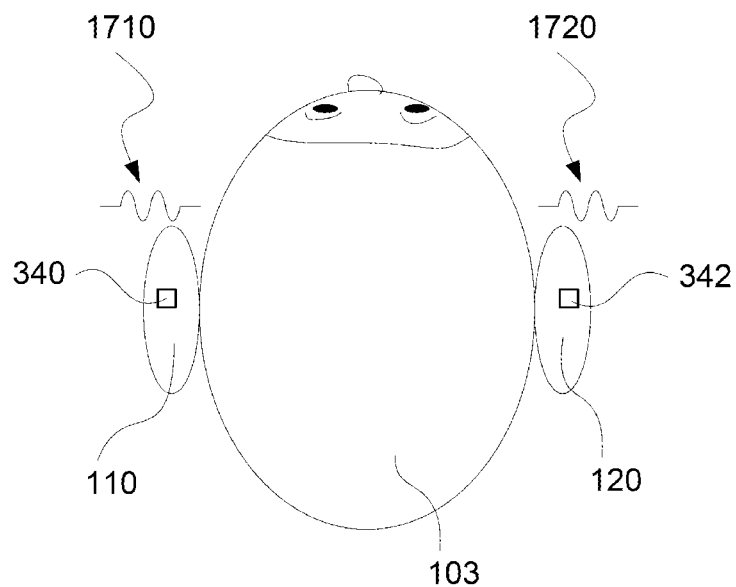
FIGS. 17A, 17B, and 17C are pictorial diagrams illustrating an example of detecting shared state using sensor signals from electrical and/or magnetic sensors.
Figure 17B:
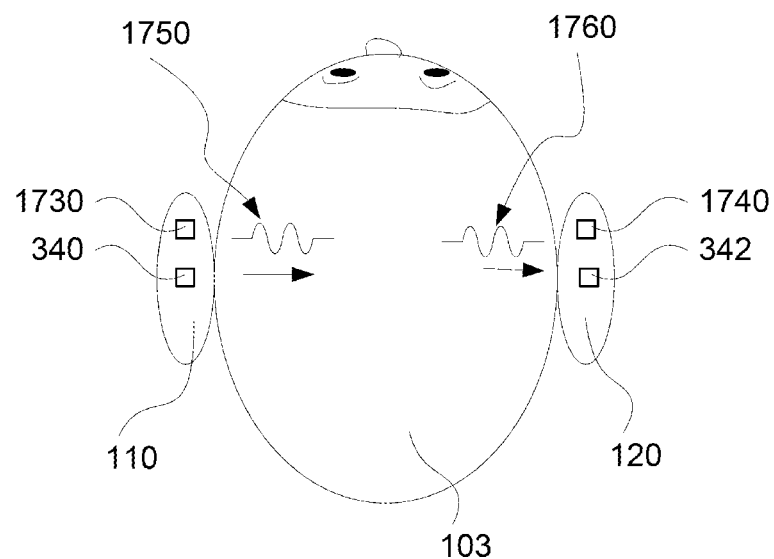
Figure 17C:
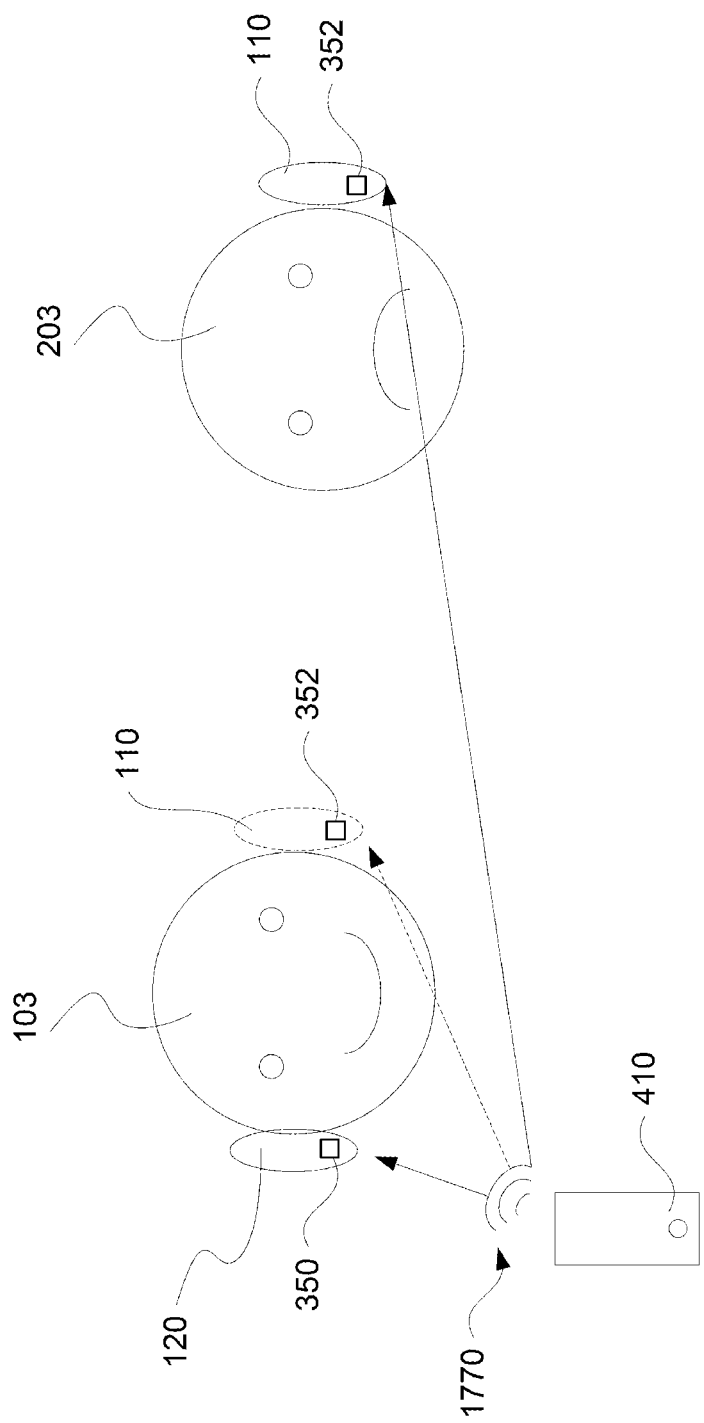

FIGS. 17A-17C illustrate example situations where electrical sensor(s) 340, 342 or magnetic sensor(s) 350, 352 in each wireless earbud 110, 120 is used to detect whether the wireless earbuds 110, 120 are being worn by the same user or different users. Any of a number of electrical or magnetic sensors may be used to detect an electrical or magnetic signal at the wireless earbud, such as a capacitive sensor, an inductive sensor, a Hall Effect sensor, etc. Grounding may be provided in the wireless earbud 110, 120. While FIG. 17A shows an example of passive detection, FIGS. 17A and 17B show examples of active detection.

Referring to FIG. 17A, electrical sensor(s) 340, 342 or magnetic sensor(s) 350, 352 may detect electrical or magnetic signals 1710, 1720 encountered by the two wireless earbuds 110, 120, and by correlating these signals from the two wireless earbuds 110, 120, the wireless earbuds 110, 120 may determine whether they are being worn by the same user or different users. For example, electrical sensor(s) 340, 342 may be included in each wireless earbud 110, 120 to detect electrical waves generated by human skin. As another example, electrical sensor(s) 340, 342 may be included in each wireless earbud 110, 120 to detect electrical waves generated by a human heart. In either example, if the wireless earbuds 110, 120 are being worn by the same user, both electrical sensors 340, 342 would detect waveforms 1710, 1720 that are approximately the same in magnitude, frequency, and phase. In contrast, if the wireless earbuds 110, 120 are being worn by different users, the electrical sensor 340 in the first earbud 110 would likely detect a waveform that is different from the electrical sensor 342 in the second earbud 120 in some way, such as one that is different in magnitude, frequency, and/or phase. Therefore, time-correlations of the two electrical signals from the two electrical sensors 340, 342 would indicate whether the two wireless earbuds 110, 120 are being worn by the same user. In some examples, the electrical sensor(s) 340, 342 may be configured to detect both electrical waves generated by the skin and the heart, and correlate these electrical signals to better determine whether the wireless earbuds 110, 120 are being worn by the same user or different users.

FIG. 17B illustrates another example situation where an electrical or magnetic sensor in each wireless earbud 110, 120 is used to detect whether the wireless earbuds 110, 120 are being worn by the same user or different users. Here, instead of passively measuring electrical or magnetic waves generated by a user, one or both of the wireless earbuds 110, 120 may include device(s) 1730, 1740 that generates an electrical or magnetic signal detectable by the electrical sensor(s) 340, 342 or magnetic sensors 350, 352 included in the wireless earbuds 110, 120.

Referring to FIG. 17B, a device 1740 in the first earbud 110 may generate an electrical signal 1750 to the user's skin. The user's skin then acts as a conductor for the electrical signal 1750. Since the second earbud 120 is also being worn by the same user, an electrical sensor 342 in the second earbud 120 may detect the electrical signal 1760 conducted through the skin. In contrast, if the wireless earbuds 110, 120 are being worn by different users, it would be unlikely that the signal would be conducted between the two users, thus, the electrical sensor 342 in the second earbud 120 would not be able to detect an electrical signal 1750 generated by the first earbud 110. Further, even if the signal is conducted between the different users, a time-correlation may indicate whether the two earbuds 110, 120 are being worn by the same user or different users. For example, the conducted electrical signal 1760 may be more distorted when traveling through different users, or there may be a time-delay in detection.

FIG. 17C illustrates yet another example situation where an electrical or magnetic sensor in each wireless earbud is used to detect whether the wireless earbuds 110, 120 are being worn by the same user or different users. For example, the magnetic sensors 350, 352 may have near-field magnetic induction communication (NFMI) capabilities. As shown, a user's device, such as phone 410, may have a transmitter coil (not shown) for modulating a magnetic field 1770, this modulated magnetic field may then be measured by a receiver coil (not shown) in each of the wireless earbuds 110, 120, for example such receiver coils may be part of magnetic sensor(s) 350, 352. If both of the wireless earbuds 110, 120 are worn by the same user, the modulated magnetic field 1770 measured by the receiver coil in both wireless earbuds 110, 120 at or about the same time would be approximately the same. In contrast, if the wireless earbuds 110, 120 are being worn by different users, the modulated magnetic field measured by the receiver coil in the first earbud 110 would likely be different from the modulated magnetic field measured by the receiver coil in the second earbud 120. For example, the difference may be in magnitude, frequency, and/or phase. Thus, a time-correlation of the modulated magnetic field 1770 measured by the receiver coils of the two wireless earbuds 110, 120 would indicate whether the two wireless earbuds 110, 120 are being worn by the same user or different users.

Additionally or alternatively, the transceiver coil of the phone 410 and the receiver coils in the wireless earbuds 110, 120 may be configured to detect a Doppler shift. For example, if both of the wireless earbuds 110, 120 are being worn by the same user, approximately the same Doppler shift would be detected from both wireless earbuds 110, 120 if the user moves towards or away from the phone 410. In contrast, if the wireless earbuds 110, 120 are being worn by different users, different Doppler shifts may be detected if the two users are moving in different directions or at different speeds. Further, a time of flight may be detected as a large Doppler shift, for example indicating when one of the wireless earbuds 110, 120 is moved from one user's ear to another user's ear.

Figure 18:
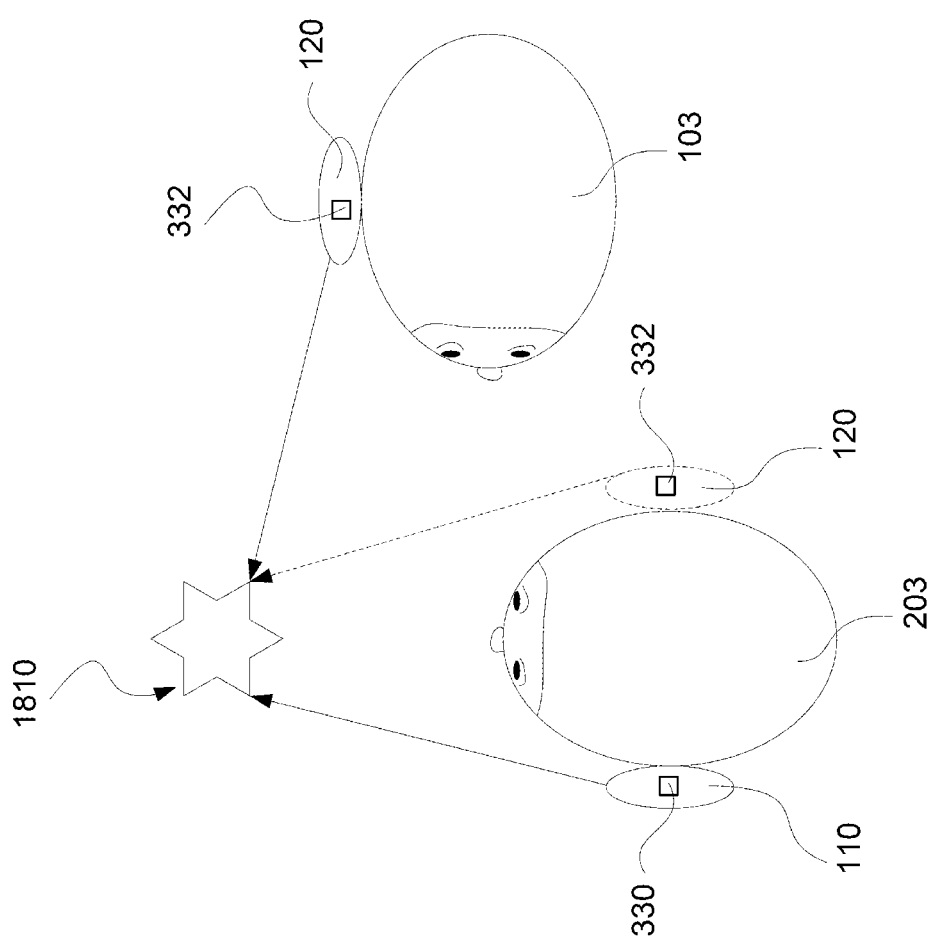
FIG. 18 is a pictorial diagram illustrating an example of detecting shared state using sensor signals from optical sensors.

FIG. 18 shows another example situation where an optical sensor is included in each wireless earbud to detect whether the wireless earbuds 110, 120 are being worn by the same user or different users. For example, the optical sensors 330, 332 may be cameras. As shown in FIG. 18, the camera 330, 332 from each wireless earbud 110, 120 may take an image of an object 1810 in front of the user 200 wearing the first earbud 110. If both of the wireless earbuds 110, 120 are worn by the same user, the image taken by the camera 330, 332 in both wireless earbuds 110, 120 at or about the same time would be approximately the same. In contrast, if the wireless earbuds 110, 120 are being worn by different users, the image taken by the camera 330 in the first earbud 110 would likely be different from the image taken by the camera 332 in the second earbud 120. In this regard, image analysis may be performed on the images taken by the two cameras 330, 332 and the results may be time-correlated to determine whether the wireless earbuds 110, 120 are being worn by the same user or different users.

In other examples, an optical sensor may be included in each wireless earbud to detect heartbeats of a user. For example, optical sensors 330, 332 may be sensors that use light to measure blood flow—photoplethysmography (PPG). The heartbeats detected by the optical sensors 330, 332 in the two wireless earbuds 110, 120 may then be time-correlated to determine whether the wireless earbuds 110, 120 are being worn by the same user or different users.

Figure 19:
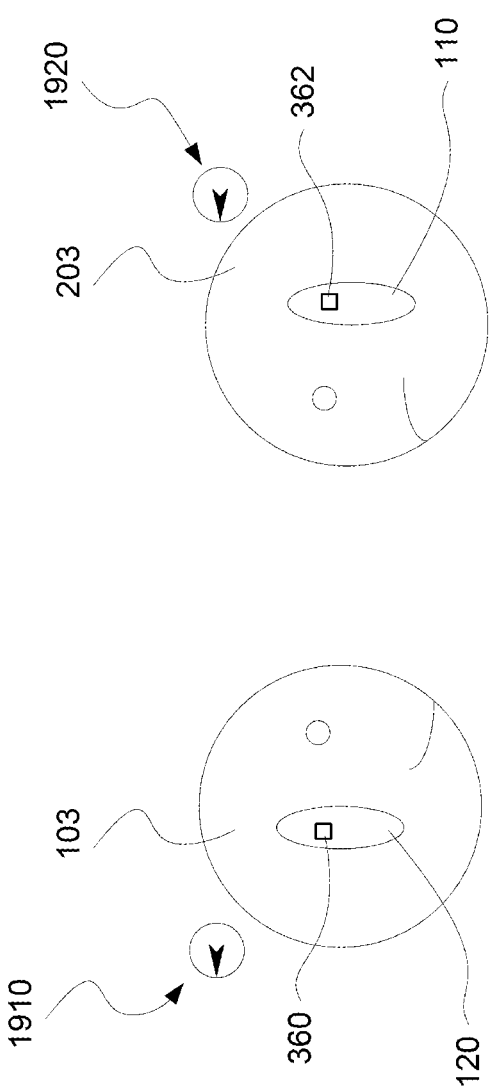
FIG. 19 is a pictorial diagram illustrating an example of detecting shared state using sensor signals from positioning sensors.

FIG. 19 illustrates an example where a positioning sensor, such as a direction sensor, is included in each wireless earbud for to detect whether the wireless earbuds are being worn by the same user or different users. For example, the positioning sensor(s) 360, 362 may each include a compass. As shown in FIG. 19, compasses 1910 and 1920 in each of the wireless earbud may point to a North direction. If both of the wireless earbuds 110, 120 are worn by the same user, both wireless earbuds 110, 120 would likely have approximately the same orientation with respect to their respective compass point (e.g., both wireless earbuds 110, 120 facing North). In contrast, if the wireless earbuds 110, 120 are being worn by different users, the first earbud 110 would likely have a different orientation with respect to its compass point than the second earbud 120 (e.g., the first earbud 110 facing North, the second earbud 120 facing South). Thus, a time-correlation of the orientations measured by the compasses of the two wireless earbuds 110, 120 would indicate whether the two wireless earbuds 110, 120 are being worn by the same user or different users.

The technology is advantageous because it provides for accurate and efficient detections of whether a pair of wireless earbuds are being worn by a same user, or shared by different users, which may enable a number of enriched user experiences. As described herein, accurate detections can be achieved using relatively simple computations with a relatively small amount of sensor signals collected during a short amount of time, which ensure that the earbuds are left with most of the computational and energy resources for other functions, such as processing and outputting audio. Further improvements in accuracy of the detections are provided by using additional and/or alternative types of sensor signals. The technology also provides the use of confidence scores, thresholds, and other smart decision logics as gatekeepers to ensure computational and energy efficiency. In some instances, by assuming the more likely state of being worn by the same user unless a high level of confidence is achieved or user confirmation is received, user experience may be further improved by the stability.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
    receiving, by one or more processors, one or more first sensor signals from a first sensor in a first earbud and one or more second sensor signals from a second sensor in a second earbud, wherein the first sensor signals and the second sensor signals are measurements over a period of time;
    comparing, by the one or more processors, the first sensor signals with the second sensor signals over the period of time;
    detecting, by the one or more processors based on the comparison, whether the first earbud and the second earbud are being worn by different users; and
    controlling, by the one or more processors based on detecting that the first earbud and the second earbud are being worn by different users, the first earbud and the second earbud to use a shared mode.

2. The method of claim 1, wherein the first sensor signals include at least one magnitude of total angular velocity experienced by the first earbud, and the second sensor signals include at least one magnitude of total angular velocity experienced by the second earbud.

3. The method of claim 1, further comprising:
    generating, by the one or more processors, a difference profile between the first sensor signals and the second sensor signals, wherein the comparing is based on the difference profile.

4. The method of claim 3, wherein the difference profile is generated by subtracting each value in the first sensor signals from a corresponding value in the second signals, the corresponding values having timestamps closest in time.

5. The method of claim 1, further comprising:
    determining, by the one or more processors, a common time base for the first sensor signals and the second sensor signals; and
    synchronizing, by the one or more processors, the first sensor signals and the second sensor signals to the common time base, wherein the comparing is between the synchronized first sensor signals and the synchronized second sensor signals.

6. The method of claim 1, further comprising:
    determining, by the one or more processors, a time-based correlation between the first sensor signals and the second sensor signals, wherein the comparing is based on the time-based correlation.

7. The method of claim 6, further comprising:
    generating, by the one or more processors, a confidence score for detecting that the first earbud and the second earbud are being worn by different users; and
    comparing, by the one or more processors, the confidence score to a confidence threshold for detecting that the first earbud and the second earbud are being worn by different users, wherein computing the time-based correlation is based on the confidence score not meeting the confidence threshold.

8. The method of claim 1, further comprising:
determining, by the one or more processors, one or more signal metrics for the first sensor signals and the second sensor signals;
determining, by the one or more processors based on the signal metrics, whether the first sensor signals or the second sensor signals are within a predetermined quality threshold; and
requesting, by the one or more processors based on determining that the first sensor signals or the second sensor signals are not within the predetermined quality threshold, new sensor signals.

9. The method of claim 1, further comprising:
receiving, by the one or more processors, one or more secondary sensor signals from at least one secondary sensor of the first earbud or the second earbud, wherein detecting whether the first earbud and the second earbud are being worn by different user is further based on the secondary sensor signals.

10. The method of claim 9, wherein the secondary sensor signals include a first power measurement when transmitting data through a communication link from the first earbud to the second earbud, and a second power measurement when receiving data through the communication link by the first earbud from the second earbud.

11. The method of claim 9, wherein the secondary sensor signals include touch sensor signals indicating that a positioning of the first earbud or the second earbud inside an ear is being adjusted.

12. The method of claim 9, wherein the secondary sensor signals include acceleration signals indicating that a positioning of the first earbud or the second earbud inside an ear is being adjusted.

13. The method of claim 9, further comprising:
generating, by the one or more processors, a confidence score for detecting that the first earbud and the second earbud are being worn by different users;
comparing, by the one or more processors, the confidence score to a confidence threshold for detecting that the first earbud and the second earbud are being worn by different users, wherein receiving the secondary sensor signals are based on the confidence score not meeting the confidence threshold.

14. The method of claim 1, further comprising:
generating, by the one or more processors, a prompt requesting user confirmation that the first earbud and the second earbud are being worn by different users;
receiving, by the one or more processors, user input confirming that the first earbud and the second earbud are being worn by different users, wherein controlling to use the shared mode is further based on receiving the user input.

15. The method of claim 1, further comprising:
generating, by the one or more processors, a confidence score for detecting that the first earbud and the second earbud are being worn by different users;
comparing, by the one or more processors, the confidence score to a confidence threshold for detecting that the first earbud and the second earbud are being worn by different users, wherein controlling to use the shared mode is based on the confidence score meeting the confidence threshold.

16. The method of claim 1, further comprising:
receiving, by the one or more processors, on-head detection sensor signals indicating whether the first earbud and the second earbud are both being worn, wherein receiving the first sensor signals and the second signals are based on the on-head detection sensor signals indicating that the first earbud and the second earbud are both being worn;
not receiving, by the one or more processors, the first sensor signals and the second sensor signals when the on-head detection sensor signals indicate that at least one of the first earbud and the second earbud is not being worn.

17. The method of claim 16, further comprising:
controlling, by the one or more processors, to stop receiving sensor signals after a predetermined period of time following the on-head detection indicating that both the first earbud and the second earbud are being worn.

18. The method of claim 1, further comprising:
controlling, by the one or more processors, based on detecting that the first earbud and the second earbud are not being worn by different users, the first earbud and the second earbud to use a normal mode.

19. A system, comprising:
a first earbud including one or more sensors;
a second earbud including one or more sensors; and
one or more processors configured to:
receive one or more first sensor signals from a first sensor in the first earbud and one or more second sensor signals from a second sensor in the second earbud, wherein the first sensor signals and the second sensor signals are measurements over a period of time;
compare the first sensor signals with the second sensor signals over the period of time;
detect, based on the comparison, whether the first earbud and the second earbud are being worn by different users; and
control, based on detecting that the first earbud and the second earbud are being worn by different users, the first earbud and the second earbud to use a shared mode.

20. The system of claim 19, wherein the one or more sensors of the first earbud and the one or more sensors of the second earbud each include at least one of: a gyroscope, an accelerometer, an electrical sensor, a magnetic sensor, an optical sensor, a positioning sensor.

* * * * *